US012762960B2

(12) United States Patent
Mollahan et al.

(10) Patent No.: US 12,762,960 B2
(45) Date of Patent: Oct. 13, 2026

(54) BATTERY-BASED FLIGHT PLANNING FOR ELECTRIC AIRCRAFT

(71) Applicant: Joby Aero, Inc., Santa Cruz, CA (US)

(72) Inventors: Kellen Christopher Mollahan, Summit, NJ (US); Karl Weston Schulz, Long Island City, NY (US); Matthew Schwegler, San Francisco, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 276 days.

(21) Appl. No.: 18/449,448

(22) Filed: Aug. 14, 2023

(65) Prior Publication Data

US 2024/0054903 A1 Feb. 15, 2024

Related U.S. Application Data

(60) Provisional application No. 63/397,579, filed on Aug. 12, 2022.

(51) Int. Cl.
*G08G 5/34* (2025.01)
*B60L 3/12* (2006.01)
(Continued)

(52) U.S. Cl.
CPC .................. *G08G 5/34* (2025.01); *B60L 3/12* (2013.01); *B64C 29/0008* (2013.01); *G08G 5/22* (2025.01); *B60L 2200/10* (2013.01)

(58) Field of Classification Search
CPC .... G08G 5/34; G08G 5/22; B60L 3/12; B60L 2200/10; B64C 29/0008
(Continued)

(56) References Cited

U.S. PATENT DOCUMENTS 3,035,789 A 5/1962 Young
4,022,405 A 5/1977 Peterson
(Continued)

FOREIGN PATENT DOCUMENTS

EP 0945841 A1 9/1999
EP 2698749 A1 2/2014
(Continued)

OTHER PUBLICATIONS

Bennaceur et al., "Passenger-centric urban air mobility: Fairness trade-offs and operational efficiency", Transportation Research Part C: Emerging Technologies, 2022, 29 pages.
(Continued)

*Primary Examiner* — Isaac G Smith
(74) *Attorney, Agent, or Firm* — Dority & Manning, P.A.

(57) ABSTRACT

Example aspects of the present disclosure relate to battery-based flight planning for electric vehicles. The example method includes accessing a performance reserve requirement associated with aerial operations within an airspace and battery conditions for one or more batteries onboard an electric aircraft. The method includes computing a reserve state of charge for the electric aircraft to complete a future flight within the airspace based on the performance reserve requirements and the battery conditions. The method includes computing one or more battery charging parameters for the electric aircraft to complete the future flight based on the reserve state of charge. The method includes confirming an electric aircraft's ability to perform the future flight, adjusting a preflight activity, or adjusting the future flight based on the battery charging parameters.

22 Claims, 13 Drawing Sheets

(51) Int. Cl.
*B64C 29/00* (2006.01)
*G08G 5/22* (2025.01)

(58) Field of Classification Search
USPC ............................................................. 701/2
See application file for complete search history.

(56) References Cited

U.S. PATENT DOCUMENTS

| | | | |
|---|---|---|---|
| 5,823,468 | A | 10/1998 | Bothe |
| 5,839,691 | A | 11/1998 | Lariviere |
| 5,842,667 | A | 12/1998 | Jones |
| 6,343,127 | B1 | 1/2002 | Billoud |
| 6,892,980 | B2 | 5/2005 | Kawai |
| 8,016,226 | B1 | 9/2011 | Wood |
| 8,020,804 | B2 | 9/2011 | Yoeli |
| 8,311,686 | B2 | 11/2012 | Herkes et al. |
| 8,733,690 | B2 | 5/2014 | Bevirt et al. |
| 8,737,634 | B2 | 5/2014 | Brown et al. |
| 8,849,479 | B2 | 9/2014 | Walter |
| 9,205,930 | B2 | 12/2015 | Yanagawa |
| 9,387,928 | B1 | 7/2016 | Gentry et al. |
| 9,415,870 | B1 | 8/2016 | Beckman et al. |
| 9,422,055 | B1 | 8/2016 | Beckman et al. |
| 9,435,661 | B2 | 9/2016 | Brenner et al. |
| 9,442,496 | B1 | 9/2016 | Beckman et al. |
| 9,550,561 | B1 | 1/2017 | Beckman et al. |
| 9,663,237 | B2 | 5/2017 | Senkel et al. |
| 9,694,911 | B2 | 7/2017 | Bevirt et al. |
| 9,771,157 | B2 | 9/2017 | Gagne et al. |
| 9,786,961 | B2 | 10/2017 | Dyer et al. |
| 9,802,702 | B1 | 10/2017 | Beckman et al. |
| 9,816,529 | B2 | 11/2017 | Grissom et al. |
| 9,838,436 | B2 | 12/2017 | Michaels |
| 10,140,873 | B2 | 11/2018 | Adler et al. |
| 10,152,894 | B2 | 12/2018 | Adler et al. |
| 10,216,190 | B2 | 2/2019 | Bostick et al. |
| 10,249,200 | B1 | 4/2019 | Grenier et al. |
| 10,304,344 | B2 | 5/2019 | Moravek et al. |
| 10,330,482 | B2 | 6/2019 | Chen et al. |
| 10,593,215 | B2 | 3/2020 | Villa |
| 10,593,217 | B2 | 3/2020 | Shannon |
| 10,752,365 | B2 | 8/2020 | Galzin |
| 10,759,537 | B2 | 9/2020 | Moore et al. |
| 10,768,201 | B2 | 9/2020 | Luo et al. |
| 10,832,581 | B2 | 11/2020 | Westervelt et al. |
| 10,836,470 | B2 | 11/2020 | Liu et al. |
| 10,913,528 | B1 | 2/2021 | Moore et al. |
| 10,948,910 | B2 | 3/2021 | Taveira et al. |
| 10,960,785 | B2 | 3/2021 | Villanueva et al. |
| 11,130,566 | B2 | 9/2021 | Mikic et al. |
| 11,145,211 | B2 | 10/2021 | Goel et al. |
| 11,238,745 | B2 | 2/2022 | Villa et al. |
| 11,295,622 | B2 | 4/2022 | Goel et al. |
| 11,509,154 | B1 * | 11/2022 | Ferrier .................. B64D 43/00 |
| 2010/0079342 | A1 | 4/2010 | Smith et al. |
| 2014/0179535 | A1 | 6/2014 | Stückl et al. |
| 2016/0311529 | A1 | 10/2016 | Brotherton-Ratcliffe et al. |
| 2017/0197710 | A1 | 7/2017 | Ma |
| 2017/0357914 | A1 | 12/2017 | Tulabandhula et al. |
| 2018/0018887 | A1 | 1/2018 | Sharma et al. |
| 2018/0053425 | A1 | 2/2018 | Adler et al. |
| 2018/0216988 | A1 | 8/2018 | Nance |
| 2018/0273211 | A1 * | 9/2018 | Chang ..................... H02M 7/44 |
| 2018/0308366 | A1 | 10/2018 | Goel et al. |
| 2018/0354636 | A1 | 12/2018 | Darnell et al. |
| 2019/0146508 | A1 | 5/2019 | Dean et al. |
| 2019/0221127 | A1 | 7/2019 | Shannon |
| 2019/0315471 | A1 * | 10/2019 | Moore .................... B64C 17/02 |
| 2019/0316849 | A1 | 10/2019 | Abrego et al. |
| 2020/0103922 | A1 | 4/2020 | Nonami et al. |
| 2020/0182637 | A1 | 6/2020 | Kumar et al. |
| 2020/0290742 | A1 * | 9/2020 | Kumar ................... B64D 27/35 |
| 2020/0388166 | A1 | 12/2020 | Rostamzadeh et al. |
| 2020/0388167 | A1 * | 12/2020 | Chase .................. G06Q 10/047 |
| 2021/0241234 | A1 * | 8/2021 | Tian ................... G06Q 10/1093 |
| 2023/0361590 | A1 * | 11/2023 | Lacaux ............. H02J 7/007182 |

FOREIGN PATENT DOCUMENTS

| | | | |
|---|---|---|---|
| EP | 3499634 | A1 | 6/2019 |
| JP | 2010095246 | A | 4/2010 |
| JP | 2013086795 | A | 5/2013 |
| WO | WO 2018023556 | A1 | 2/2018 |
| WO | WO 2019089677 | A1 | 5/2019 |
| WO | WO 2020252024 | A1 | 12/2020 |

OTHER PUBLICATIONS

Jong, "Optimizing cost effectiveness and flexibility of air taxis: A case study for optimization of air taxi operations", University of Twente, Master's thesis, 2007, 62 pages.
Miao et al., "Data-driven robust taxi dispatch under demand uncertainties", IEEE Transactions on Control Systems Technology 27, No. 1, 2017, 16 pages.
Miao et al., "Taxi dispatch with real-time sensing data in metropolitan areas: A receding horizon control approach", In Proceedings of the ACM/IEEE Sixth International Conference on Cyber-Physical Systems, 2015, 15 pages.
Uber, "Fast-forwarding to a future of on-demand urban air transportation", 2016, 99 pages.

* cited by examiner

DEVICE REGISTER 455A

| DEVICE ID | ENTITY | LOCATION | STATUS | AVAILABILITY |
|---|---|---|---|---|
| 123765 | GROUND DRIVER | AA.325, -BB.745 | ONLINE | NOT AVAILABLE |
| N4876R3 | GROUND DRIVER | CC.154, -DD.654 | ONLINE | AVAILABLE |
| 987567T | AERIAL FACILITY | EE.325, -BB.412 | ONLINE | AVAILABLE |
| GR34526 | AERIAL FACILITY | GG.115, -HH.875 | ONLINE | AVAILABLE |
| 7YT098 | PILOT | II.345, -JJ.486 | ONLINE | AVAILABLE |
| 3456-00-YT-1 | PILOT | EE.325, -FF.412 | ONLINE | NOT AVAILABLE |
| Q9087103 | PILOT | --- | OFFLINE | NOT AVAILABLE |
| . . . | . . . | . . . | . . . | . . . |

FIG. 4B

SERVICE INSTANCE REGISTER 455B

| DEVICE ID | ENTITY | LOCATION | ETA |
|---|---|---|---|
| 123765 | GROUND DRIVER | AA.325, -BB.745 | COMPLETE |
| 987567T | AERIAL FACILITY | EE.325, -BB.412 | --- |
| GR34526 | AERIAL FACILITY | GG.115, -HH.875 | --- |
| 7YT098 | PILOT | II.345, -JJ.486 | 23 MIN. |
| . . . | GROUND DRIVER | . . . | . . . |

FIG. 4C

BATTERY-BASED FLIGHT PLANNING FOR ELECTRIC AIRCRAFT

RELATED APPLICATIONS

The present application claims the benefit of and priority to U.S. Provisional Patent Application No. 63/397,579, filed Aug. 12, 2022, which is hereby incorporated by reference in its entirety.

FIELD

The present disclosure relates generally to electric aircraft.

BACKGROUND

Transportation service applications allow individual users to request transportation. For example, service providers can match drivers/vehicles to requests for transporting a rider to a requested destination or delivering packages, goods, or prepared foods. Computing platforms can be used to help facilitate these services.

SUMMARY

Aspects and advantages of implementations of the present disclosure will be set forth in part in the following description, or may be learned from the description, or may be learned through practice of the implementations.

An example method includes accessing a performance reserve requirement associated with aerial operations within an airspace. The method includes accessing data indicative of one or more battery conditions for one or more batteries onboard an electric aircraft. The method includes, based on the performance reserve requirements and the one or more battery conditions, computing a reserve state of charge for the electric aircraft to complete a future flight within the airspace. The method includes, based on the reserve state of charge, computing one or more battery charging parameters for the electric aircraft to complete the future flight. The method includes computing an action associated with the electric aircraft based on the one or more battery charging parameters. The action includes at least one of: (i) a confirmation of the electric aircraft's ability to perform the future flight; (ii) a downtime adjustment to a preflight activity; or (iii) a flight adjustment to the future flight. The method includes transmitting, over a network, instructions indicative of the action associated with the electric aircraft.

In some example implementations, the one or more battery conditions are indicative of a capacity of the one or more batteries. The reserve state of charge is based on the performance reserve requirements and the capacity of the one or more batteries.

In some example implementations, the capacity of the one or more batteries is based on an age or a usage history of the one or more batteries.

In some example implementations, the one or more battery conditions are indicative of a current state of charge or a future predicted state of charge of the one or more batteries onboard the electric aircraft.

In some example implementations, the preflight activity includes a charging activity for increasing a state of charge of the one or more batteries onboard the electric aircraft. Providing the instructions indicative of the action associated with the electric aircraft includes providing data indicative of the one or more battery charging parameters for increasing the state of charge of the one or more batteries onboard the electric aircraft.

In some example implementations, the method further includes accessing data indicative of a route for the future flight and computing a flight state of charge for traversing the route for the future flight. Computing the one or more battery charging parameters for the electric aircraft to complete the future flight further includes computing the one or more battery charging parameters for the electric aircraft based on the flight state of charge for traversing the route for the future flight.

In some example implementations, the future flight is associated with a flight itinerary indicative of a payload for the future flight. Computing the flight state of charge for traversing the route for the future flight is based on the payload for the future flight.

In some example implementations, the method further includes accessing data indicative of one or more flight maneuvers for the future flight and computing a buffer state of charge for performing the one or more flight maneuvers for the future flight. Computing the one or more battery charging parameters for the electric aircraft to complete the future flight further includes computing the one or more battery charging parameters for the electric aircraft based on the buffer state of charge for performing the one or more flight maneuvers for the future flight.

In some example implementations, the electric aircraft is an electric vertical take-off and lift vehicle including rotors that are configured to adjust from a first position to a second position. The first position of the rotors is configured for providing a lift force for the electric aircraft. The second position of the rotors is configured for providing a forward thrust force for the electric aircraft. The reserve state of charge is computed based on an energy efficiency of the electric aircraft while the rotors are in the second position. The buffer state of charge is computed based on an energy efficiency of the electric aircraft while the rotors are in the first position.

In some example implementations, the future flight is an intermediate transportation leg of a multi-modal transportation service.

In some example implementations, the electric aircraft is performing a current flight before the future flight.

In some example implementations, computing the action associated with the electric aircraft includes accessing data indicative of a progress of a ground transportation service for a user currently assigned to the future flight, and computing the action of the electric aircraft based on the data indicative of the progress of the ground transportation service.

Another example aspect of the present disclosure is directed to one or more non-transitory, computer-readable media storing instructions that are executable by one or more processors to cause the one or more processors to perform operations. The operations include accessing a performance reserve requirement associated with aerial operations within an airspace. The operations include accessing data indicative of one or more battery conditions for one or more batteries onboard an electric aircraft. The operations include, based on the performance reserve requirements and the one or more battery conditions, computing a reserve state of charge for the electric aircraft to complete a future flight within the airspace. The operations include determining an action associated with the electric aircraft based on the reserve state of charge. The action includes at least one of: (i) a confirmation of the electric aircraft's ability to perform of the future flight, (ii) a downtime adjustment to a preflight activity; or (iii) a flight adjustment to the future flight. The operations include providing instructions indicative of the action associated with the electric aircraft.

In some example implementations, the one or more battery conditions are indicative of a current state of charge or a future predicted state of charge of the one or more batteries onboard the electric aircraft. The action associated with the electric aircraft is based on the current state of charge or the future predicted state of charge of the one or more batteries onboard the electric aircraft.

In some example implementations, the operations further include accessing data indicative of a route for the future flight and computing a flight state of charge for traversing the route for the future flight. Computing the one or more battery charging parameters for the electric aircraft to complete the future flight further includes computing the one or more battery charging parameters for the electric aircraft based on the flight state of charge for traversing the route for the future flight.

In some example implementations, the future flight is associated with a flight itinerary indicative of a payload for the future flight. Computing the flight state of charge for traversing the route for the future flight includes computing the flight state of charge for traversing the route based on the payload.

In some example implementations, the flight adjustment to the future flight includes a modification to the flight itinerary, wherein the modification comprises adjusting the payload of the aircraft for the future flight based on the one or more battery charging parameters.

In some example implementations, adjusting the payload of the aircraft includes decreasing the payload in response to the state of charge being below the flight state of charge for traversing the route for the future flight or increasing the payload in response to the state of charge exceeding the flight state of charge for traversing the route for the future flight.

In some example implementations, increasing the payload includes adding a user to the flight itinerary.

Yet another aspect of the present disclosure is directed to a computing system. The computing system includes one or more processors and one or more tangible, non-transitory, computer readable media that store instructions that are executable by the one or more processors to cause the computing system to perform operations. The operations include accessing a performance reserve requirement associated with aerial operations within an airspace. The operations include accessing one or more battery conditions for one or more batteries onboard an electric aircraft. The operations include, based on the performance reserve requirements and the one or more battery conditions, computing a reserve state of charge for the electric aircraft to complete a future flight within the airspace. The operations include computing a reserve state of charge for the aircraft based on the performance reserve requirements and the one or more battery conditions. The reserve state of charge indicates a reserve battery charge level for completing a future flight within the airspace. The operations include, based on the reserve state of charge, computing one or more battery charging parameters for the electric aircraft to complete the future flight. The operations include determining an action associated with the electric aircraft based on the one or more battery charging parameters. The operations include providing instructions indicative of the action associated with the electric aircraft.

Other example aspects of the present disclosure are directed to other systems, methods, vehicles, apparatuses, tangible non-transitory computer-readable media, and devices for battery-based flight planning for electric aircraft.

These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which:

FIGS. 4B-C depict an example device registers for allocating computing resources for providing a transportation service according to example implementations of the present disclosure;

DETAILED DESCRIPTION

Figure 1:
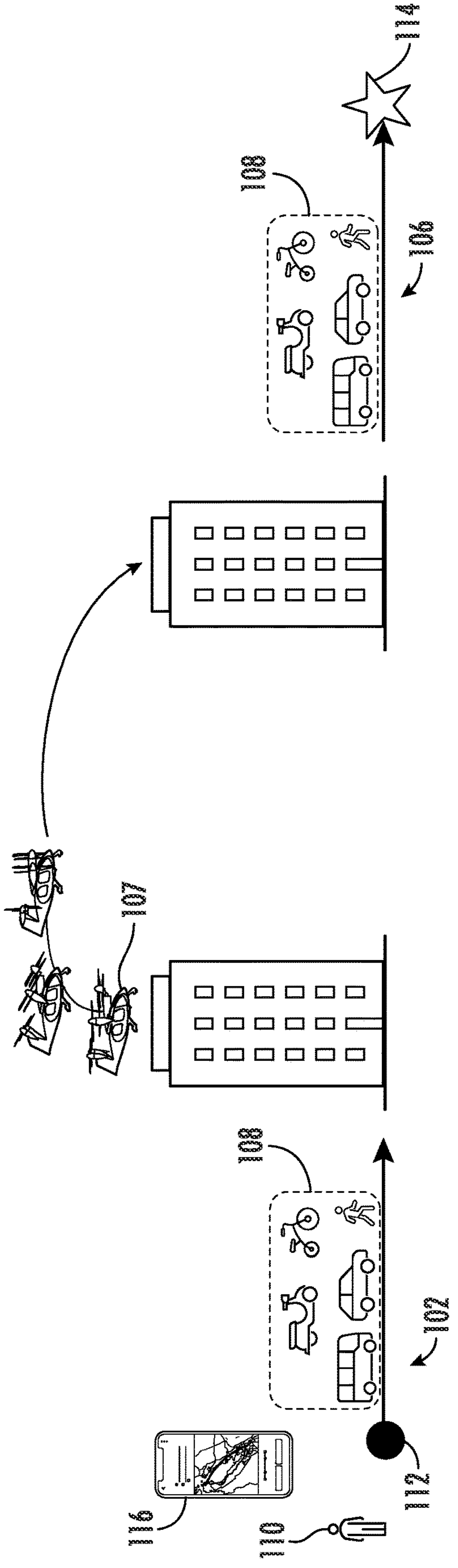
FIG. 1 depicts an example transportation service according to example implementations of the present disclosure.

Generally, the present disclosure is directed to improved techniques for battery-based flight planning for electric aircraft. For example, in one aspect of flight planning it is generally desired or required to ensure that the aircraft holds enough energy in reserve to achieve, in addition to the planned flight, a certain amount of additional flight time or range, which is referred to more generally as a "performance reserve requirement." Where the energy is petroleum-based fuel, the amount of reserve fuel that is needed to satisfy the performance reserve requirement can be calculated based on the average miles per gallon (and in turn average time per mile based on the planned speed) that the aircraft is rated for. For electric-based powertrains, however, performing the same calculation is not possible or effective due to a variety of reasons, including the nonlinear nature of the energy supply and because achievable performance is not solely related to the amount of charge stored in the battery. In particular embodiments, a computing system is disclosed that can compute a reserve state of charge for a specified performance reserve requirement based on battery characteristics, flight plans, or other factors. The computing system can include, for example, a cloud-based computing platform configured to coordinate and manage flight operations for a fleet of aircraft.

The computing system can compute the reserve state of charge for a specific electric aircraft using real-time information, a plurality of look-up tables storing preprocessed state of charge information, or machine-learned algorithms trained using labeled historical observations.

The computed reserve state of charge indicates a level of charge or a temperature range of the batteries of the electric aircraft to accomplish the flight time/range specified by the performance reserve requirements. The computing system can access various battery-specific conditions to compute the reserve state of charge. For instance, the computing system can access a look-up table associated with a specific electric aircraft. The look-up table can include a plurality of battery conditions for the electric batteries onboard the electric aircraft. The plurality of battery conditions can identify a battery type, age, configuration, etc. for each electric battery located onboard the electric aircraft. This information can be monitored (e.g., by an onboard or offboard computing system) and updated to reflect previous or current conditions. In some implementations, as further described herein, predicted future conditions can be used.

The computing system can utilize the battery conditions to access an initial reserve state of charge for the specific electric aircraft that is tailored to the electric batteries onboard the electric aircraft. The initial reserve state of charge for the specific electric aircraft can be one of a plurality of precomputed initial reserve states of charge for a plurality of aircraft that are stored in a look-up table. The plurality of initial reserve states of charge can be stored in association with one or more battery conditions. The computing system can utilize the battery conditions of the electric aircraft to access an initial reserve state of charge from the reserve look-up table that corresponds to the battery conditions for the specific electric aircraft.

The computing system can refine the initial reserve state of charge for the specific aircraft to accommodate for one or more conditions of a future flight for the aircraft. These conditions can include the route of the future flight, the payload of the future flight, or real-time environment conditions. For example, the computing system can increase the initial reserve state of charge to account for the predicted payload (e.g., of passengers and luggage) of the aircraft during the flight as well as any adverse weather conditions such as, for example, high external temperature, increased humidity, and/or other environmental conditions that may have an impact on a battery's state of charge throughout a flight.

The computing system can determine an action for the electric aircraft based on the reserve state of charge that improves on-demand battery-based flight planning for a transportation service. The action can improve the efficiency of a computing network for transportation services. For instance, the computing system can facilitate resources for a planned future flight.

A planned future flight of the electric aircraft can be associated with a transportation leg of a transportation itinerary, such as a multi-modal transportation itinerary. The multi-modal transportation itinerary can include a plurality of transportation legs associated with different transportation modalities. As an example, the multi-modal transportation itinerary can include an initial ground transportation leg, an intermediate aerial transportation leg, and a last ground transportation leg. The future flight can correspond to the intermediate aerial transportation leg. The multi-modal transportation itinerary can be a data structure that defines various parameters including vertiport locations, take-off times, estimated arrival times, routes, flight corridors (e.g., skylanes), passenger manifests, charging parameters between flights, etc.

The action can include: (i) the initial planning of the future flight (e.g., itinerary generation); (ii) a confirmation of the ability of an electric aircraft to perform a previously planned future flight; (iii) a flight adjustment to the previously planned future flight; or (iv) a downtime adjustment to a preflight activity.

A flight adjustment can include reducing a payload for the future flight by proactively limiting or reassigning passengers or cargo from a future flight to another transportation itinerary. The payload can be reduced to lower the battery charge necessary for performing the future flight and allow the electric aircraft to maintain a reserve state of charge. In this manner, real-time flight-planning that accounts for new inputs for electric aircraft, such as the reserve state of charge, can be leveraged to improve the provision of a computationally complex transportation service.

The technology of the present disclosure can provide a number of benefits and technical effects. For instance, the technology of the present disclosure can enable an aerial transportation service to reliably determine a state of charge for completing an aerial transportation service while complying with regulatory reserve requirements. The state of charge can be specific to an aircraft at a particular time and can take into account a wide range of dynamically changing variables related to electric-powered aircraft and their specific battery configurations. The technology disclosed herein presents a new technique for generating a new data structure (e.g., reflecting threshold states of charge) based on newly available information such as vehicle specific battery conditions, etc. This new data can be practically utilized to improve aerial transportation computing technologies. For example, the reserve state of charge described herein can be used, in combination with other threshold battery state information to make real-time flight planning decisions that reliably account for dynamically changing variables in battery technologies. In this way, the systems and methods of the present disclosure provide a technical improvement in the realm of electrical systems and battery technology.

The technology of the present disclosure can improve the performance of an electric aircraft by calibrating its charge reserves based on the aircraft's particular flight modes and component configurations. For instance, an eVTOL aircraft can operate in a hover mode to provide a lift force and a cruise mode to provide a forward thrust force. The eVTOL aircraft can utilize more battery charge when operating in the hover mode than in the cruise mode. The technology of the present disclosure can predict when the eVTOL aircraft is expected to operate in each of these modes for a future flight and compute the specific charging needs of the eVTOL aircraft based on the different respective energy profiles for the different flight modes. This can improve the computational efficiency of a flight planning computing system by improving its ability to accurately flight plan and assign electric aircraft to flights. This leads to less post-flight, downstream service adjustments that utilize additional computational resources. Moreover, the computing system can more effectively coordinate aircraft charging, which ultimately improves battery treatment, extending battery life, as well as the aircraft's overall flight performance.

Example Transportation Service

FIG. 1 depicts an example process flow of transportation service according to example implementations of the present disclosure. The transportation service can include a multi-modal transportation service. A multi-modal transportation service can include multiple transportation legs 102, 104, 106 associated with at least two different transportation modalities. For example, the multi-modal transportation service can include a first transportation leg 102, one or more second transportation legs 104, and a third transportation leg 106.

A combination of ground vehicles, aircraft, or other types of vehicles can perform the various legs of the multi-modal transportation service. Each transportation leg of the multi-modal transportation service can be associated with a respective transportation modality. For instance, the first transportation leg 102 can be associated with a first transportation modality using one or more of ground vehicles 108 such as an automobile. A second transportation leg 104 can be associated with a second transportation modality using an air-based modality such as an aircraft 107. The third transportation leg 106 can be associated with a third transportation modality, which can be the same or different from the first or second modalities. For example, the third transportation leg 106 can use a ground modality such as another automobile, bicycle, walking route, etc.

The aerial transport can include one or more different aircraft such as airplanes, vertical take-off and landing vehicles ("VTOLs"), or other aircraft including conventional take-off and landing vehicles ("CTOLs"). VTOLs, for example, can include one or more different types of rotorcraft (e.g., helicopters, quadcopters, gyrocopters, etc.), tilt-rotor aircraft, powered-lift vehicles, and/or any other vehicle capable of vertically taking-off and/or landing (e.g., without a runway).

As shown in FIG. 1, the aircraft used in the multi-modal transportation service can include a VTOL that is configured to operate in multiple flight modes. For example, an aircraft can include multirotor configurations such that the position, orientation, etc. of the aircraft's rotors can be adjusted to allow the aircraft to operate in the various flight modes. This can include, for example, a first rotor position that allows the aircraft to take-off, land, or hover vertically and a second rotor position that allows the aircraft to travel forward (e.g., "cruise") using a thrust force.

The aircraft can include one or more types of power sources such as batteries, a combustible fuel source, electrochemical sources (such as hydrogen fuel cell system), or a combination thereof. For example, the aircraft can include electric VTOLs ("eVTOLs") capable of operating using one or more electric batteries, VTOLs capable of operating using combustible fuel, or VTOLs using hybrid propulsion systems.

The multi-modal transportation service can be provided in an on-demand manner. The service can include a ridesharing, ride-hailing, vehicle reservation, or delivery service. The multi-modal transportation service can be coordinated for a user 110 by one or more service providers.

A service provider can be an entity that offers, coordinates, manages, etc. a transportation service. This can include a transportation network company, vehicle fleet manager, etc. For example, a user 110 may desire to travel on a journey from an origin location 112 to a destination location 114. The user 110 can interact with a user device 116, via a user interface of a software application, to book transportation for the journey. The user 110 can interact with user device 116 over one or more user sessions.

Based on the user sessions, at least one service entity can compile one or more options for the user 110 to traverse the journey. The user device 116 of the user 110 may present these options to the user 110 via a user interface of the software application. At least one option for the journey can include the multi-modal transportation service. Responsive to selection of the multi-modal transportation service option by the user 110, the service can be initiated for transportation for user 110.

To track and coordinate the multi-modal transportation service, a user itinerary can be computed for the user 110. A user itinerary (also referred to as a "multi-modal itinerary") can be defined by a data structure that includes various information associated with a user's trip from an origin location to a destination location. As used herein, user itinerary may refer to the user itinerary or the underlying data structure depending on the context. The user's itinerary may include: identifiers for locations of interest (e.g., names/coordinates for origins, destinations, vertiports, etc.), times/durations the user is at each location, transportation modalities, specific vehicle assignments, seat assignments, real-time location data, luggage information, or other information. The user itinerary can be updated in real-time as the user 110 progresses along the journey, in response to any changes to the journey, etc. The user itinerary can be available to the user 110 via the user device 116.

Building user itineraries on-demand across modalities can involve centralized or distributed scheduling of resources associated with each modality. For instance, example implementations can involve systems and devices that interface with user 110, systems and devices associated with a first modality of transportation, and systems and devices associated with a second modality of transportation.

Figure 2:
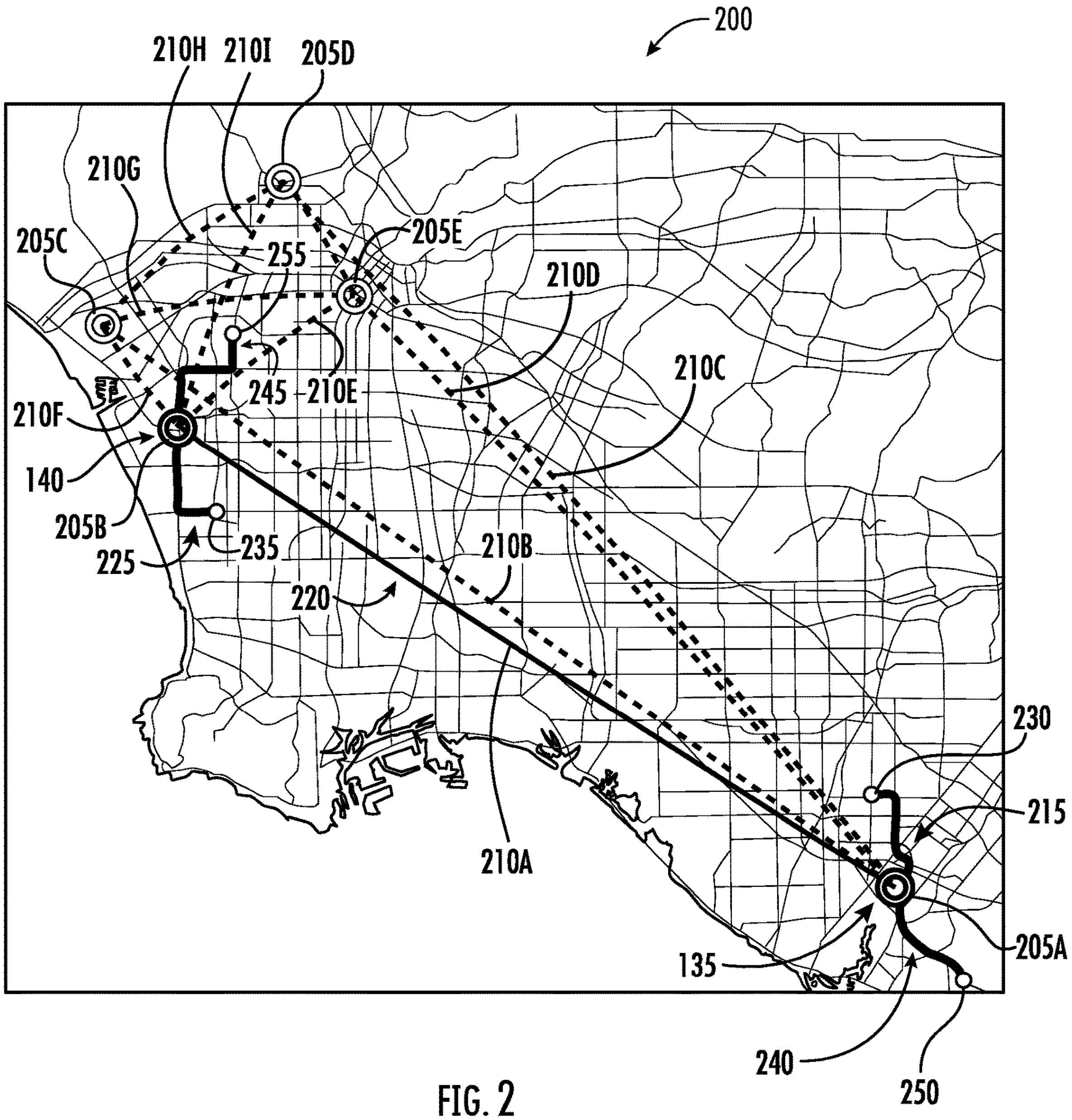
FIG. 2 depicts a map diagram of an example transportation itinerary and aerial routes according to example implementations of the present disclosure.

The itinerary of the user 120 can be based on the user's origin location, destination location, available intermediate locations for transitioning between transportation modalities, vehicle routes, or other information. For example, FIG. 2 depicts a graphical map diagram of an example transportation service (e.g., multi-modal transportation service) within a geographic area 200 according to example implementations of the present disclosure. The geographic area 200 can be, for example, an urban environment.

The geographic area 200 can include a network of intermediate locations that can be used for transitioning a user from one transportation modality to another. For instance, the geographic area 200 can include a plurality of aerial facilities 205A-E. The aerial facilities 205A-E (e.g., vertiports) can allow a user to transition from a ground transportation modality to an aerial transportation modality, or vice versa. The plurality of aerial facilities 205A-E can be placed at various locations within the geographic area 200. The plurality of aerial facilities 205A-E can be connected by a plurality aerial routes 210A-J. In some implementations, the aerial routes 210A-J can be designed with respect to airspace constraints (e.g., noise constraints, air traffic constraints, etc.). In some implementations, demand modeling can be performed to select high value infrastructure locations for placing the plurality of aerial facilities 205A-E throughout the geographic area 200 and generating routes 210A-J between the aerial facilities 205A-E, without interfering with the airspace constraints. This network of aerial facilities 205A-E and routes 210A-J can be utilized to create flight plans for aircraft used within the transportation service 100 to indicate how and where a particular aircraft may travel throughout an operational time period.

Multiple users can be pooled together for multi-modal transportation services, such that different user itineraries can share at least one transportation leg. This can include pooling users to share an intermediate transportation leg (e.g., a flight on an aircraft), even though the users may have different origin or destination locations.

By way of example, a first user itinerary for a first user can include three transportation legs 215, 220, and 225 (shown in bold in FIG. 2). The first user itinerary can include transporting the first user from a first origin location 230 to a first intermediate location (e.g., aerial facility 205A) to a second intermediate location (e.g., aerial facility 205B) and, ultimately, to a first destination location 235. The first and second intermediate locations can be determined based on their proximity (e.g., being the closest aerial facilities) to the first origin location 230 and the first destination location 235, respectively. The first user itinerary can include ground transportation (e.g., cars, etc.) along the first and last transportation legs 215, 225 and an aerial transportation (e.g., VTOLs) along the intermediate transportation leg 220.

A second user itinerary for a second user can include three transportation legs 240, 220, and 245 (shown in bold in FIG. 2). The second user itinerary can include transporting the second user from a second origin location 250 to the first intermediate location (e.g., aerial facility 205A) to the second intermediate location (e.g., aerial facility 205B) and, ultimately, to a second destination location 255. The second user itinerary can include ground transportation along the first and last transportation legs 240, 245 and an aerial transportation along the intermediate transportation leg 220.

The first user and the second user can be pooled together for the intermediate transportation leg 220. For example, the first user itinerary and the second user itinerary can respectively indicate that the first user and the second user are to travel in the same flight of an aircraft traveling along route 210A, to transport the users between aerial facility 205A and aerial facility 205B. In this manner, the first and second users can share at least one transportation leg for cost and power efficient multi-modal transportation.

Example Aerial Facility

The intermediate locations within a multi-modal transportation service can be configured to help seamlessly transition users from one transportation leg or modality to another. As described herein, these intermediate locations can include aerial facilities for facilitating the take-off (e.g., departure) and landing (e.g., arrival) of aircraft utilized in a multi-modal transportation service.

Figure 3:
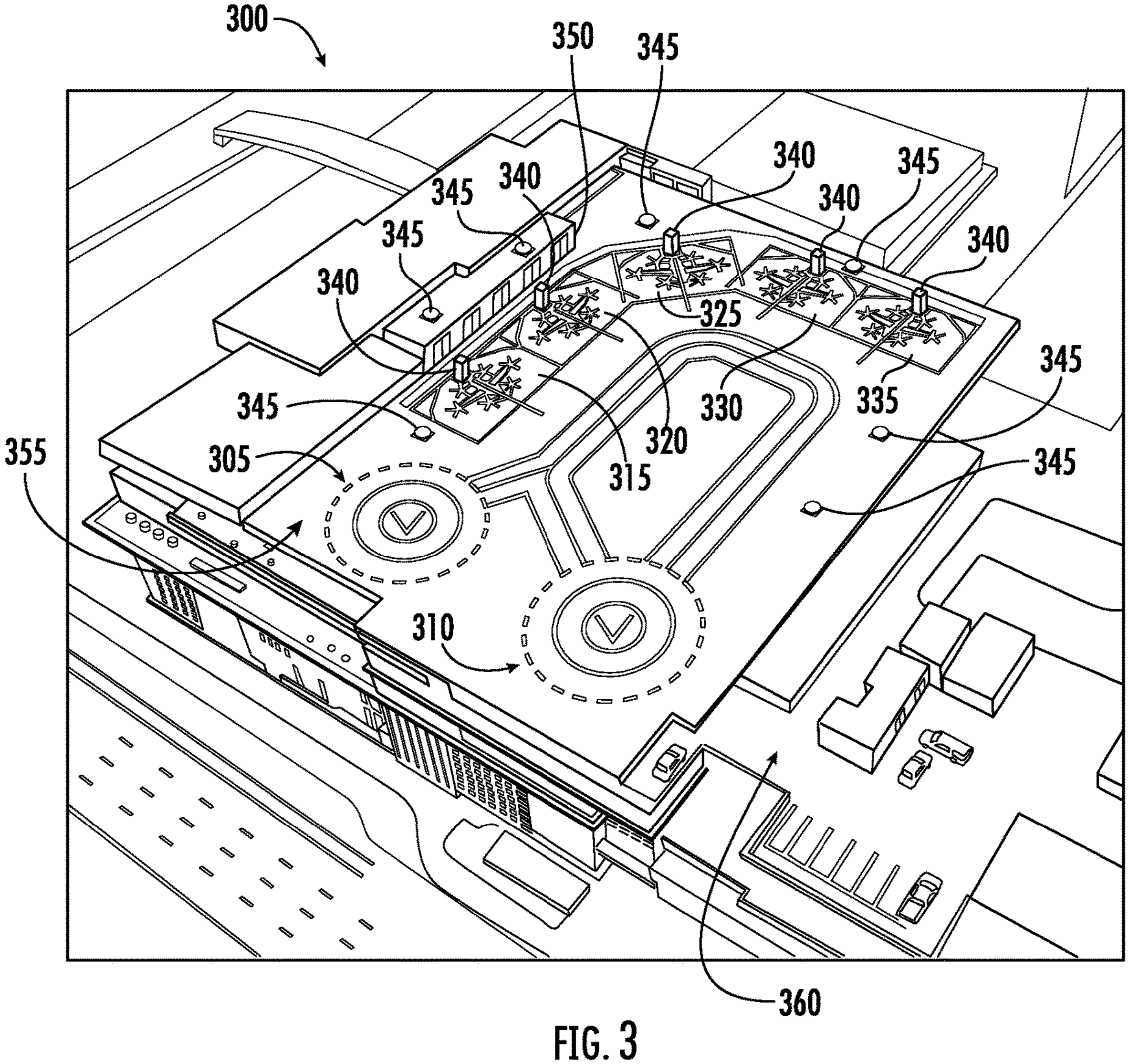
FIG. 3 depicts a graphical representation of an example aerial facility according to example implementations of the present disclosure.

By way of example, FIG. 3 depicts a graphical diagram of an example aerial facility 300 according to example implementations of the present disclosure. The aerial facility 300 can include a vertiport with one or more final approach and landing pads 305, 310 (e.g., FATO pads), one or more vehicle parking locations 315-335, or other infrastructure for maintaining and facilitating the functions of aircraft (e.g., VTOLs). For example, the aerial facility 300 can include infrastructure 340 which can include hardware and software for refueling or recharging an aircraft between flights. Various portions of the infrastructure 340 can be accessible at one or more of the vehicle parking locations 315-335.

The aerial facility 300 can include a structure or area for transitioning a user to and from an aerial transportation leg of a multi-modal transportation service. The aerial facility 300 can be located in a geographic area where multi-modal transportation services are offered. For instance, the aerial facilities can include a building or designated area within a geographic area. In some implementations, the aerial facility 300 can be a portion (e.g., a roof, dedicated floors, etc.) of a building or structure that may be used for other purposes (e.g., commercial, residential, industrial, parking, etc.).

The aerial facility 300 can include one or more sensors 345. The sensors can include visual, audio, or other types of sensors. For example, the sensors can include cameras, microphones, vibration sensors, motion sensors, RADAR sensors, LIDAR sensors, infrared sensors, temperature sensors, humidity sensors, other weather condition sensors, etc. The sensors 345 can be configured to access sensor data (e.g., noise data, weather data, aircraft-related data, etc.) within and around the aerial facility 300.

The aerial facility 300 can include one or more output devices. The output devices can include display screens, speakers, lighting elements, or other infrastructure to communicate information to users, facility operators, vehicle operators, or other individuals at the aerial facility 300. For example, display screens can be utilized to indicate an aircraft assigned to a user and a parking location assigned to an aircraft. The aerial facility 300 can include paths for users to travel to or from aircraft. In some implementations, the output devices (e.g., lighting elements) can help indicate the paths to the users.

The aerial facility 300 can include charging infrastructure configured for charging or otherwise service the energy storage system of an aircraft. For example, the aerial facility 300 can include chargers that are configured to physically connect with the aircraft at a charge port. The chargers can provide charge to the batteries of the aircraft, to increase the charge level of the aircraft. The aerial facility 300 can include various types of chargers to accommodate various types of aircraft, types/configurations of charge points, types/configurations of batteries, etc.

The charging infrastructure can also include systems for battery conditioning. This can include, for example, systems for thermal management of the batteries of an aircraft. The thermal management systems may cool the temperature of the aircraft batteries. The battery temperature may be cooled to a target temperature for the aircraft to perform a subsequent flight. The target temperature may be based on the specification of the batteries, the parameters of the subsequent flight, the downtime of the aircraft, etc.

In some implementations, the charging infrastructure may include one or more other systems for monitoring battery health and status. This can include systems that are configured to run diagnostics on the aircraft batteries to detect any anomalies, damage, etc.

The aerial facility 300 can include one or more access points 350 for user ingress and egress. The access points 350 can include designated areas, elevators, stairwells, etc. The access points 350 can also help users to transition between transportation legs and the different modalities associated therewith. For example, after being dropped-off at the aerial facility 300 by a ground vehicle for a first transportation leg, a user can utilize an access point 350 to enter an area 355 for checking-into a flight for the next transportation leg, an area for boarding an aircraft, etc. After unloading from the aircraft at the aerial facility 300, a user can utilize an access point 350 to access an area 360 for boarding a ground vehicle for a last transportation leg.

An aerial facility 300 can be operated by various entities. For example, a service entity that manages a fleet of aircraft or coordinates a transportation service can own, control, operate, etc. the aerial facility 300. In some implementations, the aerial facility 300 can be owned, controlled, operated, etc. by a third-party facility provider. The third-party facility provider may not have its own aircraft fleet but may operate the aerial facility 300 or permit other entities to utilize the aerial facility 300.

The aerial facility 300 can be utilized by a single entity or shared among a plurality of entities. For example, a service entity that manages/operates a fleet of aircraft can own, lease, control, operate, etc. the entire aerial facility 300. The service entity and its associated fleet may exclusively utilize the aerial facility 300, such that aircraft outside the service entity's fleet are not permitted at the aerial facility 300, except in emergency circumstances. In another example, a first service entity that manages/operates a first fleet of aircraft can share the aerial facility 300 with a second service entity that manages/operates a second fleet of aircraft.

In some implementations, certain resources at the aerial facility 300 can be assigned to a particular fleet or service entity. For example, a first set of landing pads, parking pads, infrastructure, storage areas, waiting areas, chargers, etc. can be designated for the first service entity and its associated fleet. A second set of landing pads, parking pads, infrastructure, storage areas, waiting areas, etc. can be designated for the second service entity and its associated fleet. In some implementations, the resources at the aerial facility 300 can be shared such that the shared resources can be assigned dynamically, throughout an operational time period based on user/aircraft itineraries, charging needs, etc.

The aerial facility 300 can include an aerial facility computing system, not shown in FIG. 3. The aerial facility computing system can be configured to monitor and control the various resources of the aerial facility 300. This can include, for example, monitoring and controlling infrastructure such as chargers, sensors, output devices, etc. The aerial facility computing system can include one or more computing devices and can communicate with other computing systems and devices associated with the multi-modal transportation service.

Example Computing Ecosystem for Transportation Service

Figure 4A:
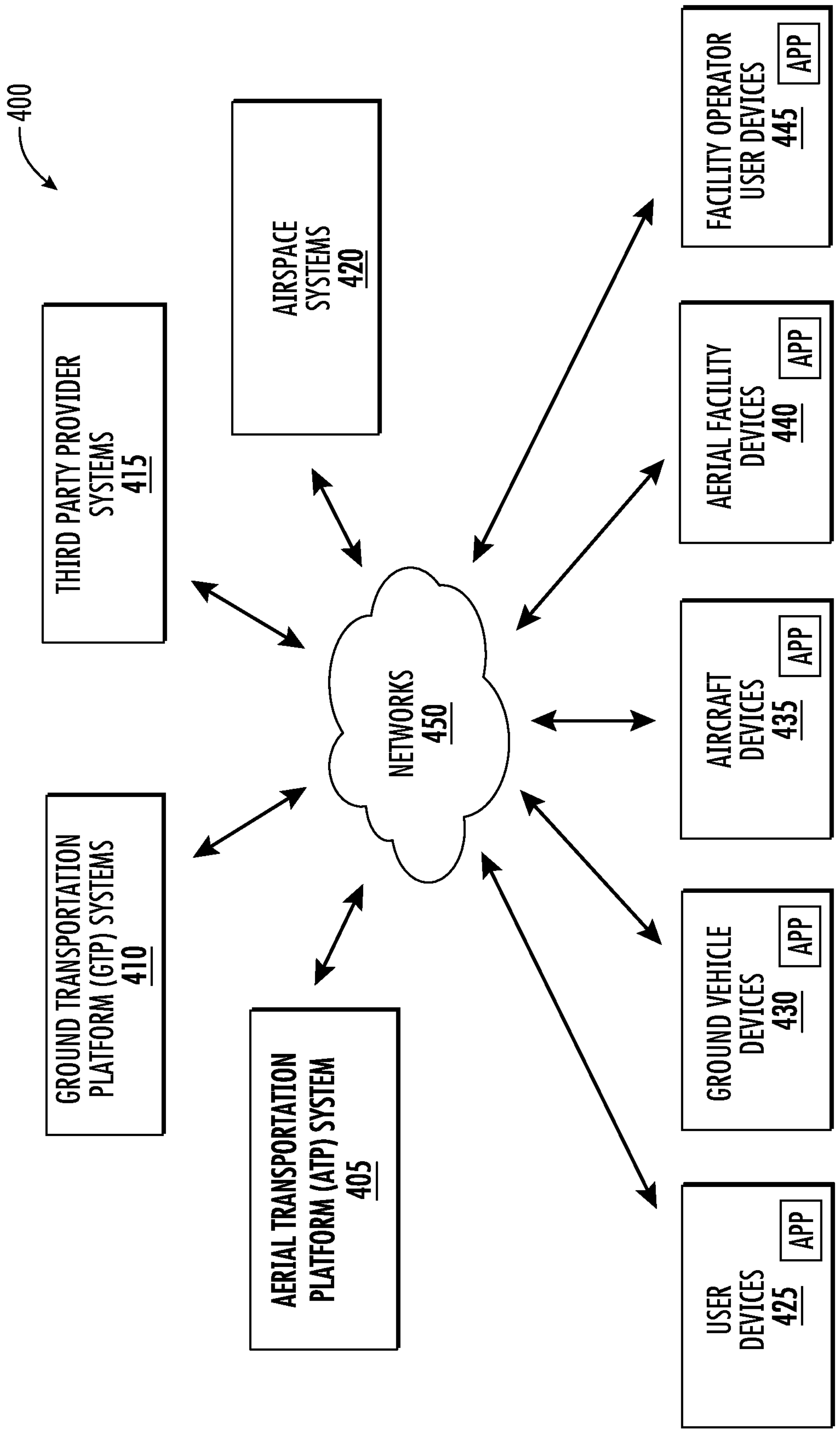
FIG. 4A depicts an example computing ecosystem for providing a transportation service according to example implementations of the present disclosure.

FIG. 4A depicts a block diagram illustrating an example networked ecosystem 400 for cross-platform coordination for transportation services, including multi-modal transportation services. Multiple network-connected systems can cooperatively interact within ecosystem 400 to provide multimodal transportation services. As shown, ecosystem 400 may include a distributed computing system with a plurality of different participating systems/devices communicatively connected over one or more networks 450.

The ecosystem 400 can include one or more transportation platform systems such as, for example, an aerial transportation platform (ATP) system 405 and one or more ground transportation platform (GTP) systems 410. The ecosystem 400 can include third-party provider systems 415, airspace systems 420, user devices 425, ground vehicle devices 430, aircraft devices 435, aerial facility devices 440, or facility operator user devices 445.

Each of the systems or devices can communicate over one or more wireless or wired networks 450. Networks 450 can include one or more types of networks including telecommunications networks, internet, private networks, or other networks, as further described herein.

The systems and devices of ecosystem 400 can include a plurality of software applications operating on the respective systems and devices. This can create an ecosystem of applications for providing and coordinating a multimodal transportation services, as further described herein.

User devices 425 can include computing devices owned or otherwise accessible to a user of a transportation service. For example, a user device 425 can include a hand-held computing device (e.g., a phone, a tablet, etc.), a wearable computing device (e.g., smart watch, smart glasses, etc.), personal desktop devices, or other devices. User devices 425 can execute one or more instructions to run an instance of a software application for a respective transportation platform and present user interfaces associated therewith. User devices 425 can include personal devices (e.g., a mobile device) or shared devices on which a user has initiated a personal session (e.g., by logging into a public kiosk or display device in a vehicle, etc.).

A GTP system 410 can be associated with a service entity that provides a ground transportation service. GTP systems 410 can include a computing platform (e.g., a cloud services platform, server system, etc.) communicatively connected over networks 450 to one or more of the systems or devices of networked ecosystem 400.

GTP systems 410 can include or implement one or more client-facing software applications accessible to the devices of ecosystem 400. Users can interact with the GTP systems 410 (e.g., using user devices 425, ground vehicle devices 430, aircraft devices 435) to receive various types of transportation services (e.g., delivery, ridesharing, or ride-hailing, etc.) including the multimodal transportation services described herein. For example, a GTP system 410 can match one of its associated ground vehicles or operators with users for a ground transportation service.

GTP systems 410 can be associated with ground infrastructure for facilitating the performance of a ground transportation service. The ground infrastructure can include one or more parking areas, vehicle transfer hubs, charging/fueling locations, storage facilities, etc.

GTP systems 410 can be associated with a fleet of ground vehicles and the vehicle operators can include a network of ground vehicle operators. As described herein, ground vehicles can include automobiles, bikes, scooters, autonomous vehicles, etc. The network of ground vehicle operators can include drivers or remote operators that facilitate, oversee, or control the movement of ground vehicles available to perform ground transportation services.

Ground vehicle devices 430 can include computing devices or systems associated with a ground vehicle or operator. For example, ground vehicle devices 430 can include one or more vehicle computing systems such as, for example, an onboard computer for operating the vehicle, an autonomy system, an infotainment system, etc. Additionally, or alternatively, ground vehicle devices 430 can include an operator's user device. For example, a ground vehicle device can be a driver's mobile phone. In some implementations, ground vehicle devices 430 can include a user device that remains onboard a ground vehicle such as, for example, a tablet that is available to an operator or passenger.

An ATP system 405 can be associated with one or more service entities that provide at least an aerial transportation service to users. ATP system 405 can include a computing platform (e.g., a cloud services platform, server system, etc.) communicatively connected over networks 450 to one or more of the systems or devices of networked ecosystem 400.

ATP systems 405 can include or implement one or more client-facing software applications accessible to the devices of ecosystem 400. Users can interact with ATP system 405 (e.g., using user devices 425, ground vehicle devices 430, aircraft devices 435) to receive various types of information related to a transportation service. For example, a user (e.g., a rider) can interact with ATP system 405 via an instance of a software application (e.g., a rider app) running on user device 425 to request and book a multimodal transportation service. A facility operator can interact with ATP system 405 via an instance of a software application (e.g., an operations app) running on an aerial facility device 440 or a facility operator user device 445 to view/adjust flight information, seat assignments, etc.

ATP systems 405 can be associated with one or more aircraft, aircraft operators, aerial facilities (or portions thereof), facility operators, etc. for facilitating the performance of at least an aerial transportation service. For example, the aircraft can include a fleet of aircraft and the vehicle operators can include a network of aircraft operators. The network of aircraft operators can include pilots or remote operators that facilitate, oversee, or control the movement of aircraft available to perform aerial transportation services.

Aerial facilities used for providing a transportation service can include one or more aerial facility devices 440. Aerial facility devices 440 can be positioned at various locations within or around the aerial facility to collect and receive information associated with an aerial transportation service. Aerial facility devices 440 can include one or more charging devices associated with charging infrastructure of the aerial facility, one or more vehicle positioning devices (e.g., motorized tugs, etc.), one or more sensors or surveillance devices (e.g., noise sensors, cameras, etc.), etc.

Facility operators can be associated with an aerial facility to assist users with security checks, check-ins, boarding/deboarding, performing aircraft checks, etc. The facility operator user devices 445 can include user devices utilized by the facility operators. Facility operator user devices 445 can be used to communicate with a transportation platform or perform various functions at an aerial facility. For example, facility operator user devices 445 can run one or more software applications to complete security checks, check in/out luggage, coordinate re-charging/refueling, present safety briefings, or the like.

Aircraft devices 435 can include one or more aircraft computing systems or aircraft operator user devices. For instance, aircraft devices 435 can include a computing system onboard an aircraft such as a pilot interface, an avionics system, an infotainment system, a navigation system, an autonomy system, or any other sensors or devices located on an aircraft and capable of sending or receiving information. Aircraft devices 435 can include an aircraft operator's user device (e.g., a pilot's mobile phone). Aircraft devices 435 can include a user device that remains onboard the aircraft such as, for example, a tablet or display that is available to a passenger or operator.

The ecosystem 400 can include one or more airspace systems 420. Airspace systems 420 can include one or more airspace data exchanges or otherwise be associated with regulatory bodies configured to collect real-time, historical, or regulatory airspace data. The airspace systems 420 can include, for example: (i) aggregating systems that pool airspace data associated with an airspace; (ii) third-party monitoring systems configured to monitor aspects of an airspace (e.g., noise, etc.); or (iii) regulatory systems that can confirm, validate, or approve an aerial transportation service before take-off based on one or more policies or standards set by a regulatory body (e.g., Federal Aviation Administration, European Aviation Safety Agency, etc.).

The ecosystem 400 can include one or more third-party provider systems 415. Third-party provider systems 415 can be associated with one or more third parties that provide resources to ATP systems 405 or GTP systems 410. For example, third-party provider systems 415 can be associated with a third-party aircraft provider, including one or more "third-party" aircraft. Third party aircraft can include aircraft provided, leased, loaned, or otherwise made available by an entity for use by ATP systems 405 for transportation services, as further described herein.

Additionally, or alternatively, third-party provider systems 415 can be associated with a provider of one or more third-party aircraft operators. Third-party aircraft operators can include, for example, a plurality of aircraft pilots that may be available to ATP systems 405 for operation of an aircraft for the transportation services.

In some implementations, third-party provider systems 415 can be associated with a third-party facility provider that can provide facilities (or facility resources) for use in performing transportation services. For example, the third-party facility provider can own, operate, etc. one or more aerial facilities (or portions thereof) that can be rented, leased, or otherwise utilized by a transportation platform system for providing an aerial transportation service. ATP systems 405 or GTP systems 410 can communicate directly or indirectly (e.g., through third-party provider systems 415) with the third-party aircrafts, operators, or infrastructure.

The systems and devices of ecosystem 400 may be registered for potential use when providing and coordinating a multimodal transportation services. FIG. 4B illustrates an example device register 455A. Device register 455A can include a table or other data structure indicating devices/systems participating in the on-demand transportation platform ecosystem, such as ecosystem 400. Device register 455A can include fields such as Device ID, Entity, Location, Status, Availability, etc.

The device register 455A can be maintained in a local or remote database. Systems and devices can register for participation in ecosystem 400 by providing information to a registration service. Such information can include system/device identifiers, associated entities, IP addresses, downloading an application, signing-up or creating an account, or other information for identifying and communicating with the system/device. The device register 455A can be updated to provide a real-time reference for the characteristics and status of participating systems/devices. This can include, for example, determining whether a device is online or offline (e.g., powered on and connected, or not) or whether the device is available (e.g., not currently being utilized for another task) or unavailable (e.g., being utilized for another task).

When building a user itinerary, a service instance register can be created, such as an example service instance register 455B shown in FIG. 4C. A service instance register can include a data structure with one or more data objects that indicate the devices to be utilized for facilitating and progressing a user along their journey.

An ATP system 405 (or another system) can build a service instance register 455B for servicing a particular service request. Service instance register 455B can be associated with a unique or distinct service instance identifier for a particular user itinerary for providing at least one leg of a transportation service. Service instance register 455B can assemble a selection of participating devices from device register 455A. Service instance register 455B can include a minimum set of participating devices to complete at least a leg of a journey. Service instance register 455B may include all participating devices to complete the entire leg of a journey.

The ATP system 405 (or another system) can update and reconfigure service instance register 455B as needed to accommodate for scheduling changes, delays, device substitution, etc. or as the journey/itinerary progresses for a particular user. For example, as the user progresses along a second leg of a particular journey, the he ATP system 405 (in communication with a GTP system 410) may identify and select a ground vehicle for servicing the last leg of the user's journey. In response, the ground vehicle device associated with the selected ground vehicle can be listed in the service instance register 455B. In this manner, service instance registers 455B can accurately reflect the systems/devices of the ecosystem 400 that are associated with each particular service instance for the users of the multi-model transportation service.

Example Aircraft

Figure 4D:
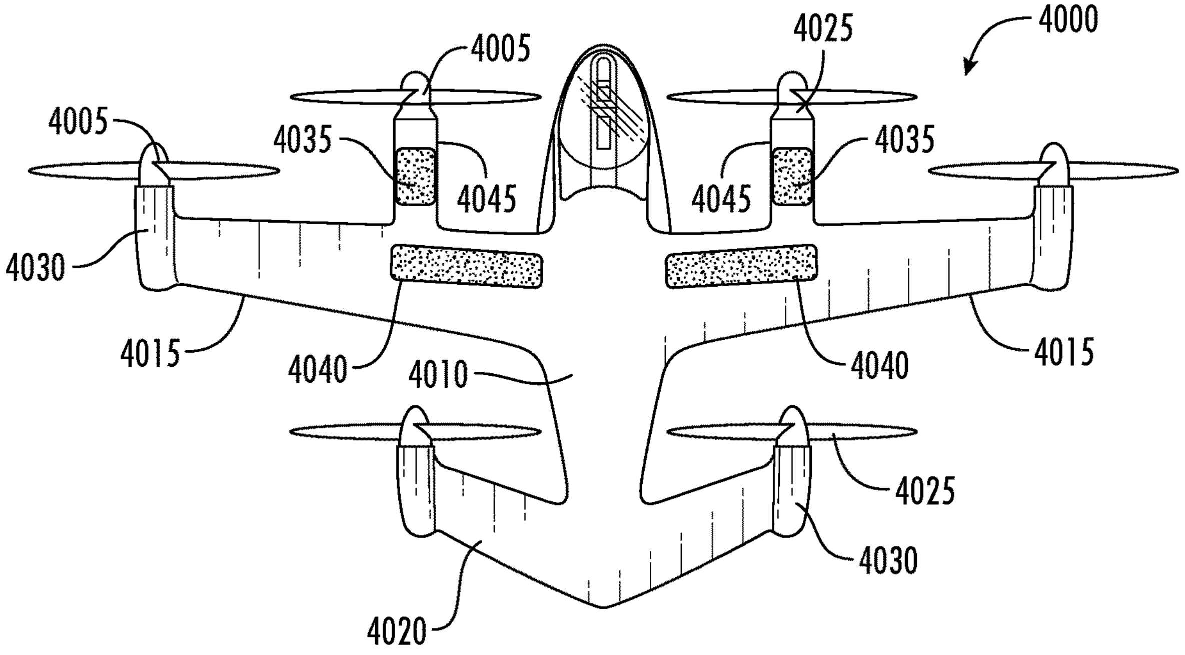
FIG. 4D depicts an example aircraft according to example implementations of the present disclosure.

FIG. 4D depicts an example aircraft 4000 according to example implementations of the present disclosure. The aircraft 4000 can be a VTOL aircraft that can perform a vertical lift and hover maneuver (e.g., to take-off and land) as well as perform a forward cruise maneuver. This can be accomplished by a moveable propulsion system such as, for example, rotor assemblies 4005 that tilts/rotates to cause a lift force in one position and a thrust force in another position. The VTOL aircraft can be an electric (eVTOL) aircraft that uses one or more batteries as a power source for providing motion of the aircraft.

The aircraft 4000 can include a fuselage 4010, two wings 4015, an empennage 4020 and propulsion systems 4025 embodied as tiltable rotor assemblies located in nacelles 4030.

The aircraft 4000 includes one or more energy storage systems. The energy storage systems can include, for example, a nonlinear power source such as nacelle battery packs 4035 or wing battery packs 4040. In the illustrated example, while the nacelle battery packs 4035 are located in inboard nacelles 4045, it will be appreciated that the nacelle battery packs 4035 can be located in other nacelles 4030 forming part of the aircraft 4000.

The aircraft 4000 can include associated equipment such as an electronic infrastructure, control surfaces, a cooling system, landing gear and so forth. The aircraft 400 can include a charge port for receiving battery charge from a charger.

The wings 4015 function to generate lift to support the aircraft 4000 during forward flight. The wings 4015 can additionally or alternately function to structurally support the battery packs 4040 or propulsion systems 4025 under the influence of various structural stresses (e.g., aerodynamic forces, gravitational forces, propulsive forces, external point loads, distributed loads, and/or body forces, and so forth).

The aircraft 4000 can be configured to operate in one or more flight modes. The flight modes may be associated with different positions of the propulsion systems 4025, nacelles 4035, 4030, and/or portion thereof.

Figure 4E:
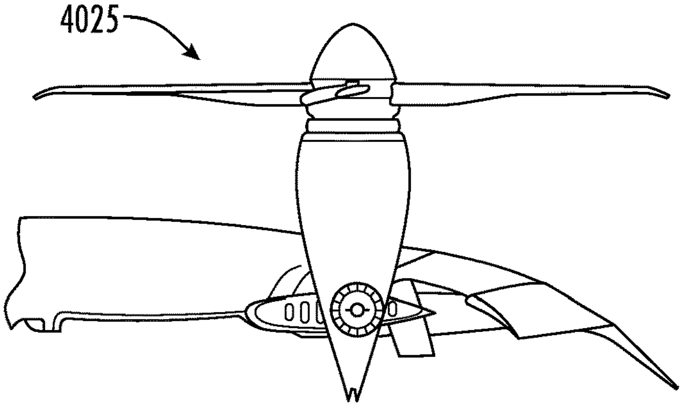
FIGS. 4E-G depict the tilting of an aircraft propulsion mechanism and related components such as a propeller and nacelle according to example implementations of the present disclosure.

The flight modes can include a hover mode. In the hover mode, the propulsion systems 4025 (or an associated portion thereof) can be oriented in a first position/angle to create a lift force on the aircraft 4000, as shown in FIG. 4E. This can allow the aircraft 4000 to hover, such that lateral movement may be reduced. In an example, the hover mode can be utilized by the aircraft 4000 to hover when the aircraft is waiting or landing at a particular vertiport.

Figure 4F:
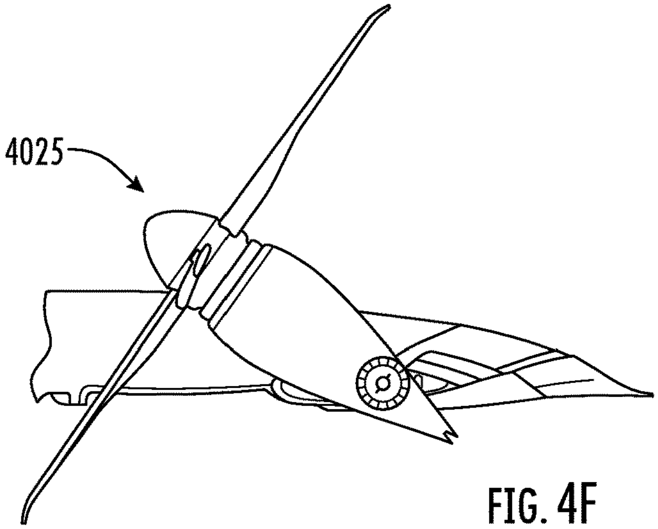
Figure 4G:
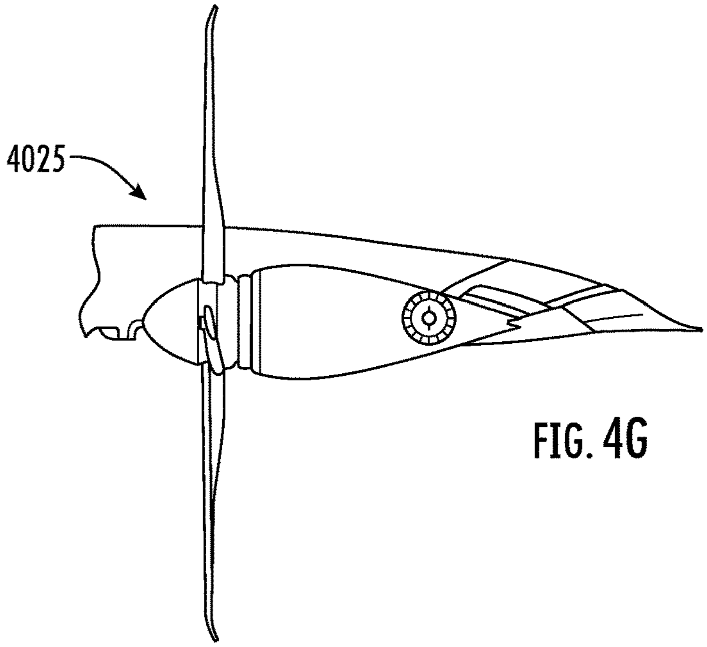

The flight modes can include a cruise mode. In the cruise mode, the propulsion systems 4025 (or an associated portion thereof) can be oriented in a second position/angle to create a forward thrust force on the aircraft 4000, as shown in FIG. 4G. In an example, the cruise mode can be utilized by the aircraft 4000 to create forward propulsion such that the aircraft can travel along a particular route for a flight.

The flight modes can include a transition mode. In the transition mode, the propulsion system 4025 (or an associated portion thereof) may move from one position or angle to another, as shown in FIG. 4F. This may occur, for example, to transition the propulsion system 4025 from a first position (e.g., for hover mode) to a second position (e.g., for cruise mode). Movement of the propulsion system 4025 may include movement of the nacelle 4035 or a portion thereof (e.g., tilt assembly). The transition mode may include the dynamic movement of the propulsion system 4025 between two positions and/or the propulsion system 4025 being in a static position (e.g., a tilt angle between the first and second position) for a time period.

In some implementations, aircraft 4000 can be configured to operate in flight modes for energy efficiency. Such modes may include adjusting one or more components of the aircraft 4000 to conserve energy. This may include, for example, adjusting the operating speed of a propulsion system 4025, powering down certain on-board functions (e.g., interior lights), etc.

Example Aircraft Ecosystem

As discussed herein, the aerial transportation platform system 405 and the ground transportation platform system 410 can plan and fulfill transportation services. The orchestration of a transportation service can be performed in a number of different implementations. For example, in a single orchestrator implementation, a transportation platform system can receive a request and orchestrate the transportation service (e.g., a multi-modal transportation service). In a multi-orchestrator implementation, a combination of transportation platforms can collaborate to orchestrate the multi-modal transportation service. This can include the use of aircraft from multiple different entities.

Figure 5:
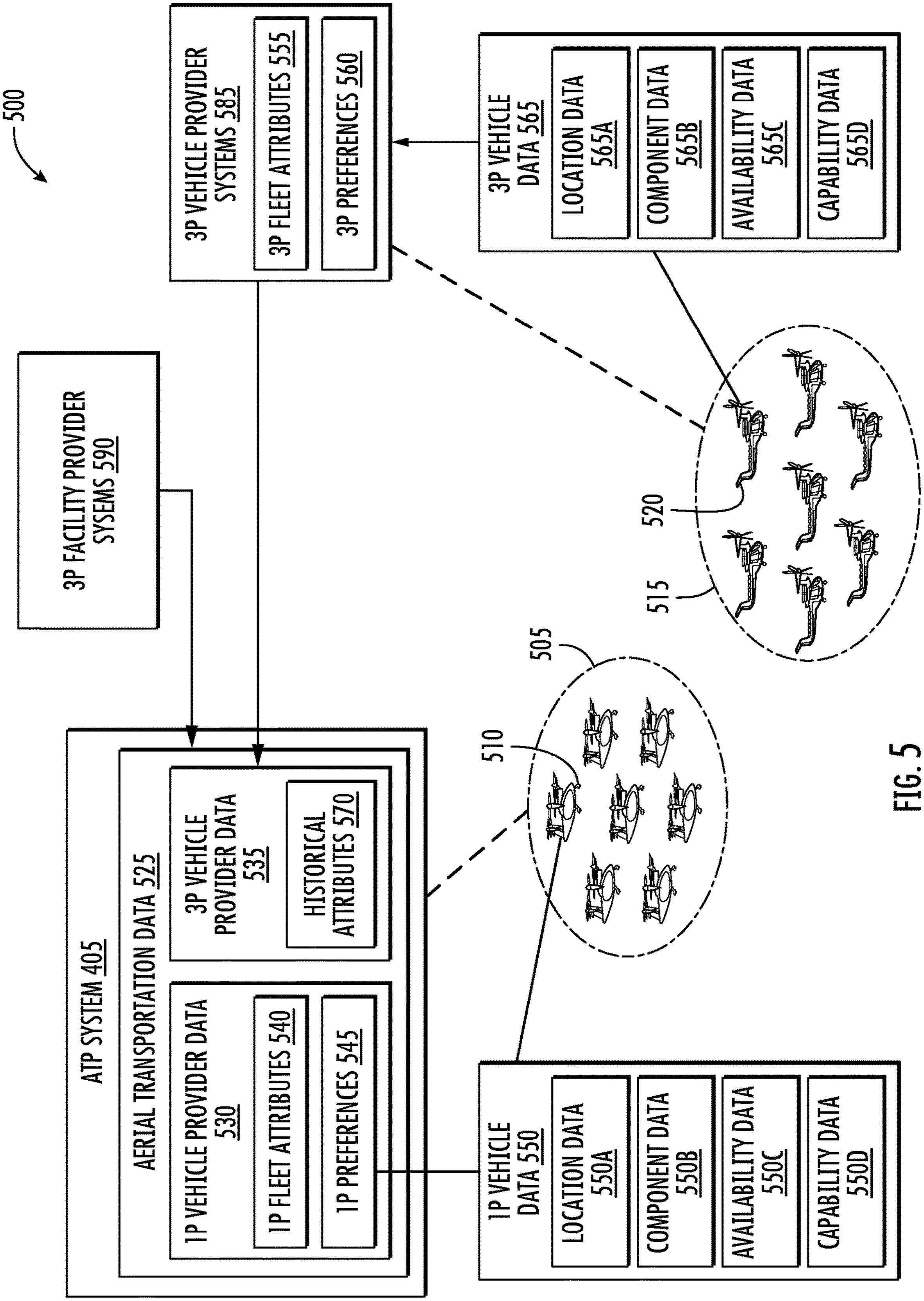
FIG. 5 depicts an example vehicle provider ecosystem according to example implementations of the present disclosure.

FIG. 5 depicts an example aerial transportation ecosystem 500 according to example embodiments of the present disclosure. The aerial transportation ecosystem 500 includes the ATP system 405 and one or more 3P vehicle provider systems 585.

The ATP system 405 can be associated with a "first-party" (1P) aircraft fleet 505. The 1P aircraft fleet 505 can include a plurality of 1P aircraft 510 owned, maintained, operated, or otherwise affiliated with the ATP system 405. A 1P aircraft can include an eVTOL owned by the entity that operates the ATP system 405.

The one or more 3P vehicle provider systems 585 can be associated with a 3P aircraft fleet 515. The 3P aircraft fleet 515 can include a plurality of 3P aircraft 520 owned, maintained, operated, or otherwise affiliated with the 3P aircraft fleet 515. 3P aircraft can be those that are outside of the dedicated fleet of "first-party" aircraft. For example, a 3P vehicle provider can decide to make its 3P aircraft available to the ATP system 405 to perform transportation services, at certain times. However, the 3P vehicle provider may maintain ownership or some level of control over 3P aircraft.

The ATP system 405 can communicate with the 1P aircraft 510 or the 3P vehicle provider systems 585 to access at least a portion of the aerial transportation data 525. The aerial transportation data 525, for example, can include 1P vehicle provider data 530 and 3P vehicle provider data 535.

The 1P vehicle provider data 530 can include one or more 1P fleet attributes 540, one or more 1P preferences 545, or 1P vehicle data 550.

The 1P fleet attributes 540 can identify one or more types of aircraft or any other attributes associated with the aircraft within the 1P aircraft fleet 505. By way of example, the 1P aircraft fleet 505 can include one or a plurality of different types of aircraft. Each different type of aircraft can be associated with one or more different aircraft attributes. Aircraft of a certain vehicle type can be associated with one or more common aircraft attributes. By way of example, a vehicle type can include a large vehicle type with a high payload capacity at the expense of speed, a small vehicle type with a low payload capacity and high speed, a luxury vehicle, a high speed vehicle, etc. In some implementations, the 1P fleet attributes 540 can identify one or more overhead costs (e.g., fixed costs, etc.) for maintaining the 1P aircraft fleet 505 or one or more opportunity costs afforded by the 1P aircraft fleet 505.

The 1P preferences 545 can indicate one or more preferences of the ATP system 405 for the performance of an aerial transportation service. The 1P preferences 545, for example, can identify an operational time period, service type (e.g., delivery, ride-share, etc.), weather conditions, geographic locations, aerial facilities, or any other attribute of a transportation service that can assist the ATP system 405 in scheduling 1P aircraft 510 for flights. As one example, an operational time period can identify a time during which the ATP system 405 prefers to use the 1P aircraft 510 to perform a transportation service. In some implementations, the 1P preferences 545 can identify attributes of a transportation service such as longer flight times, shorter flight times, types of vehicle maintenance (e.g., charging times, etc.), or any other aspect of a transportation service.

The 1P vehicle data 550 can be indicative of one or more aircraft attributes associated with each of the 1P aircraft 510 of the 1P aircraft fleet 505. By way of example, the aircraft attributes can include location data 550A, component data 550B, availability data 550C, or capability data 550D for each of the 1P aircraft 510 of the 1P aircraft fleet 505. The ATP system 405 can communicate with the 1P aircraft 510 to access the 1P vehicle data 550.

The location data 550A, for example, can identify a current, predicted, or historical location of the 1P aircraft 510. The location data 550A can be determined through one or more messages exchanged between the aerial transportation platform system 405 and the 1P aircraft 510. For instance, the location data 550A can be determined based on sensor data (e.g., GPS data, RADAR data, etc.) from one or more sensors onboard the 1P aircraft 510. As another example, the location data 550A can be determined based on one or more flight plans assigned to the 1P aircraft 510, etc.

The component data 550B can identify the types of components of the 1P aircraft. A component can include, for example, one or more hardware or software components for each of the plurality of 1P aircraft 510. The hardware components can include at least one power component (e.g., an engine, fuel tank, battery, etc.), climate control component, navigation component, flight control component, etc. The one or more software components can include one or more software applications (e.g., an operating system, a user interface, etc.) associated with each of the plurality of 1P aircraft 510.

The component data 550B can be indicative of the types, numbers, sizes, positions, orientations, etc. of the propulsion systems of the 1P aircraft 510. This can include, for example, indicating the positions, numbers, and types of rotors on a 1P aircraft 505. The component data 500B can indicate the maneuverability of the components. For example, the component data 550B can indicate which (if any) rotors are moveable/tiltable, their range of motion (e.g., by angle, position), and the timing constraints for adjusting the angle/position of the rotors.

The component data 550B can identify a current, predicted, or historical state for each aerial component of the 1P aircraft 510. The state can identify a health, power level, current software version, etc. of each of the one or more components. As one example, a current state of a power component can identify a current power level or range for each of the 1P aircraft 510. In some implementations, the current power level or range can include a dynamic variable that depends on characteristics associated with candidate flight plans.

In some implementations, the 1P aircraft 510 can include electric aircraft powered by one or more batteries. The component data 550B for an electric aircraft can include battery data indicative of a current, historical, or predicted condition of the one or more batteries. The battery data, for instance, can be indicative of a plurality of battery characteristics for the batteries. The battery characteristics can identify operating conditions of the batteries as well as a battery configuration and type.

Battery operating conditions can be indicative of a maximum capacity of the batteries at a particular time. The maximum capacity of the batteries can be based on a battery type, configuration, etc. of the batteries onboard the 1P aircraft 510. The maximum capacity can change over time based on a number of dynamic battery characteristics including, for example, a battery's age, usage history, or any other characteristic associated with the battery's capacity to hold power. For example, the maximum capacity of the batteries onboard the 1P aircraft 510 can decrease over time as the batteries age or degrade.

The battery operating conditions can also be indicative of a current state of charge (SoC) or a future, predicted SoC of the batteries onboard the 1P aircraft 510. The SoC of the batteries can indicate a level of power accessible to the 1P aircraft 510 at a particular time. The SoC can be based on a level of charge or a temperature of the batteries. The level of charge can be a function of and depend on the maximum capacity of the batteries. For instance, the level of charge can identify a percentage of the maximum capacity that is available to the 1P aircraft 510 at a particular time. The battery operation conditions can also indicate the state of health of the batteries of the 1P aircraft 510.

The battery operating conditions can be based on a battery model for a battery of an electric aircraft. The battery model can include one or more charging parameters (e.g., types of charges (e.g., slow, fast, etc.), infrastructure necessary to service the battery (standardized charging interfaces, etc.), and a range model configured to determine a range for a respective battery based on the battery's SoC or any other factor that may affect the performance of the battery.

The availability data 550C can identify a current, predicted, or historical assignment (e.g., a service assignment, a maintenance assignment, etc.) for the 1P aircraft 510. For example, the availability data 550C can be indicative of usage information (e.g., historical usage, current usage, expected usage, etc.) for the 1P aircraft 510. The usage data can be indicative of historical, current, or expected flights, maintenance, or any other tasks associated with a respective aircraft.

The capability data 550D can be associated with one or more constraints or capabilities of a respective 1P aircraft 510. For example, the capability data 550D can include at least one of a payload capacity (e.g., maximum allowable payload, weight, etc.), a seating capacity (e.g., a maximum number of passengers per flight), a performance history (e.g., miles flown, historic performance on trips for the service entity or other service providers), one or more vehicle control parameters (e.g., operational capabilities such as turning radius, lift, thrust, or drag capabilities), one or more speed parameters (e.g., maximum, minimum, or average speed, etc.), or one or more maintenance requirements (e.g., infrastructure required to perform maintenance, refueling, etc. for the aircraft, etc.).

In some implementations, the capability data 550D can indicate the flight modes of the 1P aircraft 510. For instance, the capability data 550B can indicate that a 1P aircraft 505 is capable of flying in a cruise mode, transition mode, hover mode, energy efficient mode, etc.

The capability data 550D can indicate the energy efficiency of the 1P aircraft 510 when operating in the respective flight modes. For example, the capability data 550D can include look-up tables that indicate the energy efficiency (e.g., charge consumption/burn rate) of a respective 1P aircraft 505 when operating in a cruise mode. The energy efficiency while operating in the cruise mode may include an energy profile developed during testing of the 1P aircraft 505 (or another aircraft in the fleet of 1P aircraft 510). The energy efficiency of the 1P aircraft 505 while operating in the cruise mode may be associated with the position/angle of the aircraft's propulsion system (e.g., for forward thrust), its operating speed (e.g., circular velocity), etc.

The capability data 550D can include look-up tables that indicate the energy efficiency (e.g., charge consumption/burn rate) of the respective 1P aircraft 505 when operating in a hover mode. The energy efficiency while operating in the hover mode may include an energy profile developed during testing of the 1P aircraft 505 (or another aircraft in the fleet of 1P aircraft 510). The energy efficiency of the 1P aircraft 505 while operating in the hover mode may be associated with the position/angle of the aircraft's propulsion system (e.g., for lift), its operating speed (e.g., rotational velocity), etc. Operating in the hover mode may cause the 1P aircraft 505 to consume more energy from its batteries than operating in the cruise mode.

The capability data 550D can include look-up tables that indicate the energy efficiency (e.g., charge consumption/burn rate) of the respective 1P aircraft 505 when operating in a transition mode. The energy efficiency while operating in the transition mode may include an energy profile developed during testing of the 1P aircraft 505 (or another aircraft in the fleet of 1P aircraft 510). The energy efficiency of the 1P aircraft 505 while operating in the transition mode may be provided in association with various positions/angles of the aircraft's propulsion system (e.g., for lift), its operating speeds, etc.

In some implementations, the capability data 550D can be indicative of operator capabilities associated with an operator of the 1P aircraft 510 (e.g., a pilot rank, designated operating areas, seniority, rating, etc.).

The capability data 550D can dynamically change based on the component data 550B or other real-time information such as weather conditions, etc. This information can be monitored (e.g., by an onboard system or offboard system) and updated in real-time to maintain a database that accurately reflects the aircraft.

The ATP system 405 can communicate with the 3P vehicle provider systems 585 to access the 3P vehicle provider data 535. The 3P vehicle provider data 535 can include 3P fleet attributes 555, 3P preferences 560, or 3P vehicle data 565. The 3P fleet attributes 555, the 3P preferences 560, or the 3P vehicle data 565 can include similar types of information for the 3P aircrafts 520 as any of the example 1P fleet attributes 540, 1P preferences 545, or 1P vehicle data 550 described herein. By way of example, the 3P vehicle data 565 can include location data 565A, component data 565B, availability data 565C, or capability data 565D as described with reference to the location data 550A, component data 550B, availability data 550C, and capability data 550D of the 1P vehicle data 550. The 3P vehicle provider systems 585 can communicate with the 3P aircraft 520 to access the 3P vehicle data 565.

In some implementations, the 3P vehicle provider data 535 can include 3P historical attributes 565. The 3P historical attributes 565 can be indicative of one or more historical interactions between the 3P vehicle provider systems 585 and the aerial transportation platform system 405. For example, the 3P historical attributes 565 can be indicative of one or more previous aerial transportation services provided by the 3P vehicles 520. The 3P historical attributes 565 can be indicative of a reliability, a willingness to perform various types of aerial transportation services, service time constraints met or exceeded, user reviews, etc. of the 3P vehicle provider systems 585.

Example Battery-Based Flight Planning and Charge Configuration

As described herein, a computing system can leverage the aerial transportation data 525 to plan and facilitate a plurality of flights. The plurality of flights can be performed using electric aircraft powered by a plurality of batteries. The operation of such aircraft can depend on the state of the charge for the batteries. The technology described herein can improve the planning and performance of the electric aircraft for a transportation service.

Figure 6:
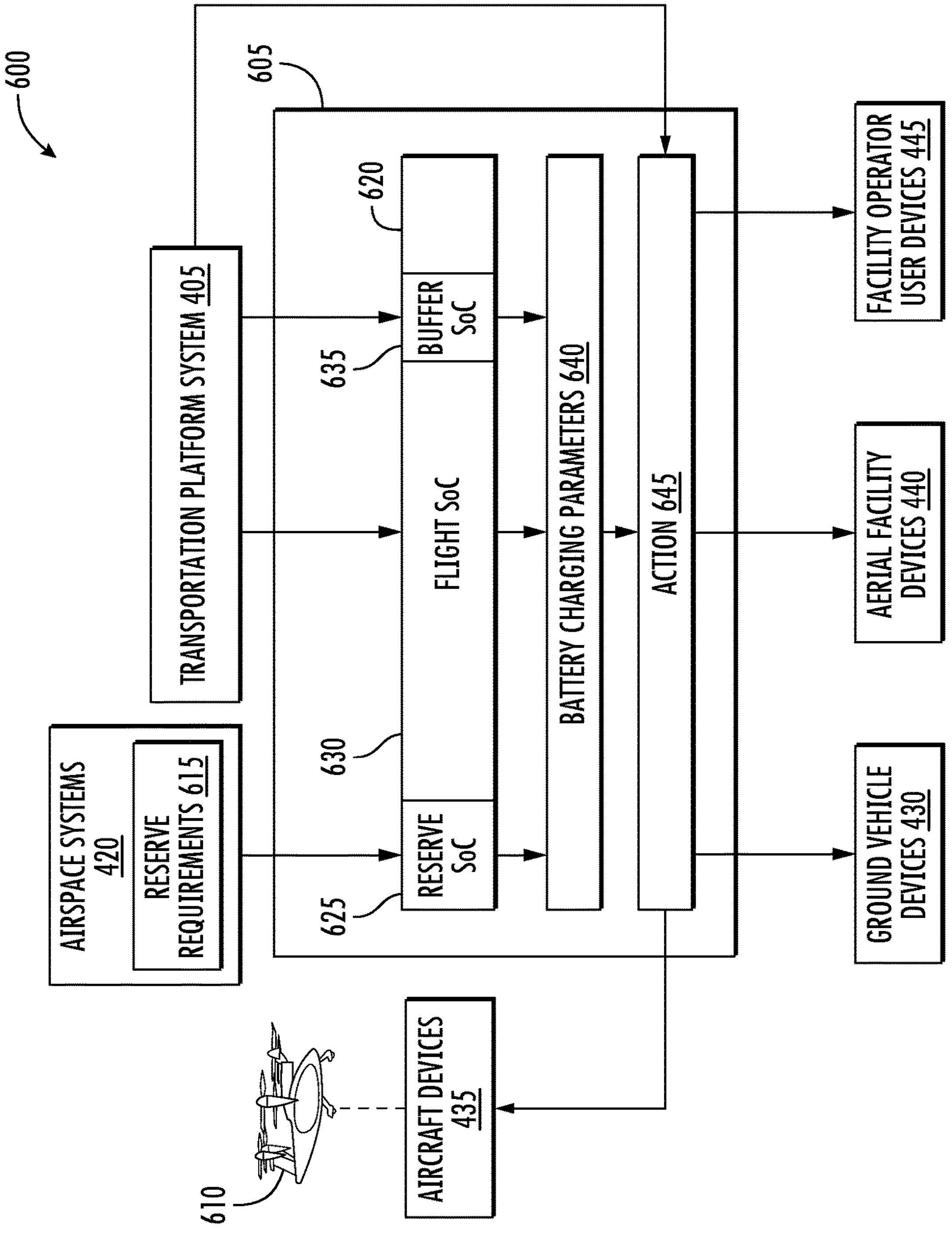
FIG. 6 depicts a block diagram for initiating an action for a future flight based on threshold states of charge according to example embodiments of the present disclosure.

FIG. 6 depicts a block diagram 600 for initiating an action for a future flight based on threshold SoCs and power reserve requirements according to example embodiments of the present disclosure. The block diagram depicts a computing system 605 that is configured to initiate the action for the future flight based on data accessed from the ATP system 405, airspace system 420, aircraft devices 435, or any other system or device of the computing ecosystem 400. The action can be initiated through communication with the ground vehicle devices 430, the aerial facility devices 440, facility operator devices 445, or any other system or device of the computing ecosystem 400.

The computing system 605 may be included within the ATP system 405 or another system configured for flight or charge planning for the electric aircraft 610. For example, ATP system 405 can include a backend system that hosts a plurality of services (e.g., microservices). The ATP system 405 may include a graph that aggregates across the services. Each respectively programmed to perform a function for the ATP system 405.

The computing system 605 may represent the implementation of at least one service of the backend system. For instance, the ATP system 405 may coordinate aerial transportation. The back-end services of the ATP system 405 may perform functions for generating flights and coordinating charging for those flights. The computing system 605 may include computing hardware that implements one or more services for evaluating candidate flights, assigning electric aircraft to flights, generating aircraft itineraries, coordinating charging, etc. As described herein, the services may collect real-time data to perform their respective functions.

In some implementations, the computing system 605 may be separate from the ATP system 405. The computing system 605 may transmit a communication to the ATP system 405 to request data. For instance, the ATP system 405 (or an entity associated therewith) may publish a software development kit (SDK) that allows another computing system to structure messages according to the APIs of the ATP system 405. The structured messages may include requests for data such as, for example, a request for candidate flights, flight information/plans, etc.

The ATP system 405 may receive a structured message at an API gateway. The API gateway may be configured to validate access to the requested data and orchestrate a call to each service that would be needed to provide the requested data. The API gateway may validate a message through a security layer that includes functions for message validation. By way of example, the API gateway may validate a message by determining that required request parameters (e.g., in the URI, query string, headers) of an incoming request are included and non-blank and/or the applicable request payload adheres to a configured scheme request model of the security layer. When the validation fails, the API gateway may fail the request and return an error response to the caller computing system. In the event a message is validated, the API gateway can call one or more services to gather and compile data to respond to the request.

The computing system 605 can access various types of information to help determine whether to assign the electric aircraft 610, to perform a candidate future flight. For instance, the computing system 605 can access performance reserve requirements 615 associated with aerial operations within an airspace. The computing system 605 can access the performance reserve requirements 615 from one or more databases maintained by an airspace system 420.

The performance reserve requirements 615 can be based on regulatory flight requirements that indicate how much energy capacity should be held in reserve measured in terms of operational parameters such as a flight time, range, or other measurement. In some cases, the performance reserve requirements 615 can depend on a geographic region or airspace or a regulatory body that governs a particular geographic region or airspace. In order to satisfy the requirements, an electric aircraft 610 should reliably land with sufficient battery power to accommodate the regulatory flight requirements.

The performance reserve requirements 615 may be associated with a particular flight mode. For example, the performance reserve requirement 615 may require that the electric aircraft 610 maintain enough charge to be able to fly in cruise mode for forty-five (45) minutes, in still air.

In some implementations, a flight may be less than the threshold time indicated in the performance reserve requirement. For example, the flight time may be eighteen minutes, which is less than the forty-minute flight time requirement specified in the performance reserve requirement. In some implementations, the performance reserve requirement may remain the same, regardless of the length of the flight. In some implementations, there may be additional regulations or guidance that indicate the amount of flight time the aircraft is required to provide with its reserve SoC when the flight time is less than that specified in the performance reserve requirement. This may be a percentage of the flight time, based on air traffic in the area, etc.

A SoC for satisfying the performance reserve requirements 615 can be specific to the electric aircraft 610 and, more particularly, to the batteries of the electric aircraft 610 at a specific point in time. For instance, unlike petroleum-based power supplies, the total capacity of an electric battery can change over time as the electric battery ages or degrades. Moreover, the range for the electric battery can change in a nonlinear nature and can be dependent on a number of real-time factors such as heat, weather, flight maneuvers, etc.

To account for the dynamic nature of electric batteries, the computing system 605 can access data indicative of one or more battery conditions for the batteries onboard an electric aircraft 610 at a current time. The data indicative of the battery conditions can be accessed from one or more aircraft device 435 (e.g., a battery monitoring system onboard the aircraft) associated with the electric aircraft 610. The battery conditions can be updated in real-time to ensure that the conditions are representative of the current state of health/charge of the batteries onboard an electric aircraft 610.

The battery conditions can be indicative of the operating conditions of the batteries onboard the electric aircraft 610 as well as a battery configuration. For example, the battery conditions can be indicative of a maximum capacity 620 of the batteries at a particular time. The maximum capacity of the batteries can be based on a battery type, configuration, etc. of the batteries onboard the electric aircraft 610. The maximum capacity can change over time based on a number of dynamic battery characteristics including, for example, a battery's age, usage history, or any other characteristic associated with the battery's capacity to hold power. For example, the maximum capacity of the batteries onboard the electric aircraft 610 can decrease over time as the batteries age or degrade. This can impact the SoC needed to satisfy the performance reserve requirements 625.

In some implementations, the battery conditions can be collected at a set time frame and utilized for an appropriate time period thereafter. For instance, the battery conditions may be collected at the beginning of the day, middle of the day, before a flight, etc. and utilized for one or more hours thereafter.

Additionally, or alternatively, the battery conditions can be collected in real-time. For example, the battery conditions can indicate the health, status, charge level, efficiency, temperature, damage, etc. of the batteries onboard the electric aircraft 610. The battery conditions can be monitored by the electric aircraft 610 (e.g., an onboard battery management system) throughout the day as the aircraft 610 is taking-off, flying to a destination, landing, taxi-ing, charging, etc. The electric aircraft 610 may provide the battery conditions to the transportation platform system 405 or the computing system 605. The real-time information can help provide the computing system 605 with an understanding of the charge consumption/burn rate on a particular day, route, location, timeframe, etc. given the operating conditions of that day. This can be utilized by the computing system 605 in its computations. The computing system 605 can also compare battery conditions collected in real-time against any previously collected or predicted battery information to confirm its accuracy.

The computing system 605 can compute a reserve SoC 625 for the batteries of the electric aircraft 610 to accommodate the performance reserve requirements 615. The reserve SoC 625 can be battery/vehicle specific and can change over time based on battery conditions for the batteries of the electric vehicle 610. The reserve SoC 625 can be indicative of a reserve battery charge level (or one more corresponding temperatures) associated with a future flight within the airspace. For instance, the reserve SoC 625 can include one or more levels of charge at one or more battery temperature ranges that will produce enough power to operate the electric aircraft 610 for a particular flight time (e.g., 45 minutes as defined in regulations), a flight range, or one or more flight maneuvers specified by the performance reserve requirements 615. The reserve SoC 625 can include a percentage of the maximum capacity 620 and can be dependent on the battery conditions at a particular time.

The computing system 605 can compute the reserve SoC 625 for the electric aircraft 610 based on the performance reserve requirements 615 and current battery conditions. For example, the computing system 605 can compute the reserve SoC 625 for the electric aircraft 610 using real-time battery conditions and a plurality of look-up tables storing preprocessed flight characteristics. The look-up tables can correlate battery conditions with a SoC for achieving performance reserve requirements 615.

The look-up tables can include a plurality of SoCs indexed based on different battery conditions or performance reserve requirements 615. Each SoC can specify a respective level of charge, a battery temperature range, or other battery parameters for achieving a respective performance reserve requirement. In some implementations, a respective SoC can include a level of charge and a temperature threshold for batteries with respective battery conditions to achieve a flight range, time, or one or more maneuvers specified by a respective performance reserve requirement.

The look-up tables can be generated or dynamically updated based on historical or real-time flight observations. For instance, the computing system 605 can collect historical or real-time flight data indicative of the conditions of the batteries of an electric aircraft, a distance traveled by the electric aircraft, a power expenditure of the electric aircraft, or any other characteristics associated with the historical or current flight. The look-up tables can be indicative of the energy/efficiency profiles of a particular aircraft. Such profiles can be computed based on aircraft testing and validation. The look-up tables can be computed based on the testing of a fleet aircraft and then refined for a particular aircraft. The computing system 605 can update the look-up table based on the historical or real-time flight data.

In addition, or alternatively, a look-up table can be generated or dynamically updated based on battery testing observations. The battery testing observations can include battery testing data for a plurality of batteries under one or more different conditions. The battery testing data can be collected during a plurality of real world or simulated test flights.

In some implementations, the historical or real-time flight observations or the battery testing observations can be used to refine a battery modeling algorithm configured to compute a reserve SoC 625 based on the performance reserve requirements 615 and the current battery conditions of a plurality of batteries. The battery modeling algorithm can include a static algorithm or a machine-learned model. By way of example, the historical or real-time flight observations or the battery testing observations can be used to train a machine-learned SoC model (e.g., using labeled data and supervised training techniques) to output accurate SoCs for corresponding performance reserve requirements 615.

The computing system 605 can access a respective look-up table (or battery algorithm) associated with the electric aircraft 610 to compute the reserve SoC 625 for the electric aircraft 610. The computing system 605 can search the look-up table using the data indicative of the current battery conditions for the batteries of the electric aircraft 610 to identify a reserve SoC 625 corresponding to the current conditions of the batteries onboard the aircraft 610. By way of example, a computing system can perform a look-up function to access a table indicative of a drag profile; a table indicative of departure maneuvers (e.g., angles, distances, altitudes, etc.) and associated energy consumption estimates; a table indicative of a decent (e.g., angles, distance, etc.) and associated energy consumption estimates.

The reserve SoC 625 can be computed based on a particular flight mode of the electric aircraft 610. For instance, as described herein, the performance reserve requirement 615 can define that the aircraft 610 is to maintain enough charge in its reserve SoC to be able to fly for forty-five (45) minutes while in cruise mode. Thus, the computing system 605 can compute the reserve SoC 625 based on the energy efficiency of the aircraft 610 when operating in cruise mode. To do so, the computing system 605 can access look-up tables that are specific the aircraft 610 operating in cruise mode.

In some implementations, the computing system 605 can utilize the battery conditions to access an initial reserve SoC for the electric aircraft 610 that is tailored to the electric batteries onboard the electric aircraft 610. The initial reserve SoC for the specific electric aircraft 610 can be one of a plurality of precomputed initial reserve SoCs for a plurality of aircraft that are stored in the look-up table. The plurality of initial reserve SoCs can be stored in association with one or more battery conditions. The computing system 605 can utilize the battery conditions of the electric aircraft 610 to access an initial reserve SoC from the look-up table that corresponds to the battery conditions for the electric aircraft 610.

In some implementations, the computing system 605 can refine the initial reserve SoC for the electric aircraft 610 to generate a computed reserve SoC 625 that accounts for one or more real-time environment conditions. The computing system 605, for example, can refine the initial reserve SoC to account for weather, outside temperatures, altitude, etc. that may impact a temperature of the batteries of the electric aircraft 610.

Moreover, the initial reserve SoC may be refined based on other conditions associated with the future flight. This may include the route, predicted traffic, and predicted payload associated with the future flight.

In an example, the initial reserve SoC can be refined so that the electric aircraft can meet the performance reserve requirement given the predicted payload for the future flight. This can include computing the reserve SoC so that the electric aircraft has enough charge to fly for thirty minutes, in still air, in cruise mode, with the predicted payload of the future flight.

The initial reserve SoC can be refined to account for the route of the future flight. For example, the initial reserve SoC may be determined such that, given the battery conditions, the electric aircraft will have enough reserve charge to be able to fly for thirty minutes, in still air, in cruise mode. When performing the future flight, the electric aircraft may be required to stay on a certain route line/flight corridor (e.g., skylane) to account for other aircraft traffic. Thus, the reserve SoC can be calibrated so that the electric aircraft will have enough reserve charge to be able to fly for thirty minutes, in still air, in cruise mode, while staying on the prescribed route/corridor.

In some implementations, the battery conditions can be indicative of a current SoC or a future, predicted SoC of the batteries onboard the electric aircraft 610. The SoC of the batteries can indicate a level of power accessible to the electric aircraft 610 at a particular time. The SoC can be based on a level of charge or a temperature of the batteries. The level of charge can be a function of and depend on the maximum capacity 620 of the batteries. For instance, the level of charge can identify a percentage of the maximum capacity that is available to the electric aircraft 610 at a particular time.

The electric aircraft 610 can perform (or be assigned to perform) a plurality of flights including a future flight and a current flight, before the future flight. The future flight can include a flight associated with a multi-modal transportation service and can be a flight that the electric aircraft 610 is at least currently (or provisionally) assigned to perform or a candidate flight for which the electric aircraft 610 is being considered. The battery conditions can include a current SoC indicative of a level of power available to the electric aircraft 610 at a current time during the current flight. In addition, or alternatively, the battery conditions can include a predicted future SoC indicative of a predicted level of power of the batteries onboard the electric aircraft 610 at a future time after the current flight. For example, the future SoC can include a predicted level of power after the electric aircraft 610 lands at an aerial facility (e.g., before the future flight).

The computing system 605 can compute one or more battery charging parameters 640 for the electric aircraft 610 to complete the future flight based on the reserve SoC 625. The battery charging parameters 640 can represent a predicted time, type of equipment, type of charge, or other characteristics for charging batteries onboard the electric aircraft 610 to achieve a particular SoC. The battery charging parameters 640 can include at least an amount of time, etc. for charging the batteries above the reserve SoC 625.

The computing system 605 can compute the battery charging parameters 640 by accessing a charging look-up table. The charging look-up table can include a plurality of charging parameters that are indexed based on battery conditions. The look-up table, for example, can include specific charging parameters correlated to various battery conditions and desired SoCs. The look-up tables can be based on historical, real-time, or testing data described herein.

In some implementations, the charging parameters can be based on particular charging infrastructure. For instance, charging infrastructure can include different manufactures, different charging speeds, or other characteristics that can impact the amount of time, etc. for charging the batteries above the reserve SoC 625. A charging look-up table can include a plurality of charging parameters that are further indexed based on particular charging infrastructure.

In addition, or alternatively, computing system 605 can compute the battery charging parameters 640 by inputting the battery conditions or a desired SoC to a battery charging algorithm. The battery charging algorithm can be statically determined or machine-learned using the historical, real-time, or testing data described herein.

The battery charging parameters 640 can be based on the current or future, predicted SoC of the electric aircraft 610. In some implementations, the computing system 605 can determine the charging parameters based on one or more additional threshold SoCs associated with a future flight. The threshold SoCs can include: (1) a flight SoC 630 for traversing the route for the future flight; or (2) a buffer SoC 635 for performing one or more flight maneuvers for the future flight (or alternative scenarios that may arise during the future flight).

The flight SoC 630 can help indicate the threshold SoC needed for traversing the route for the future flight in addition to the reserve SoC 625. For example, the flight SoC 630 can be indicative of a threshold level of charge at one or more temperature ranges, in addition to the reserve SoC 625, that will produce enough power to operate the electric aircraft 610 for the duration of the future flight. This can include enough power to perform the flight's prescribed take-off/departure maneuver, operate in cruise mode along a route (e.g., within certain flighr corridors) to arrive at a destination, perform the flight's prescribed approach/landing maneuver, and taxi to a designated area. The flight SoC 630 can be based on at least one of: (i) a flight duration, (ii) a flight distance, or (iii) environmental factors associated with a route for the future flight. The computing system 605 can access data indicative of the route for the future flight and compute the flight SoC 630 for traversing the route for the future flight based on the data.

The computing system 605 can compute the battery charging parameters 640 for the electric aircraft 610 to complete the future flight based on the flight SoC 630 for traversing the route for the future flight. This computation can be performed using an equation, algorithm, look-up table, etc. defining what threshold SoC is needed to fully traverse the route (including take-off and landing) given the environmental factors. For example, the computing system 605 can access a respective look-up table (or battery algorithm) associated with the electric aircraft 610 and the future flight (e.g., a route associated with the future flight) to compute the flight SoC 630 for the electric aircraft 610. The computing system 605 can search the look-up table using the data indicative of the current battery conditions for the batteries of the electric aircraft 610, the route associated with the future flight, etc. to identify a flight SoC 630 corresponding to the current conditions of the batteries onboard the aircraft 610 and the future flight for the aircraft 610.

In some implementations, the flight SoC 630 can be based on one or more flight parameters such as the payload of the aircraft, one or more weather patterns, a geographic region, or any other flight characteristics that can impact the expenditure of power during the future flight. As one example, the future flight can be associated with a flight itinerary indicative of a payload for the future flight. The payload can be indicative of a carrying weight in addition to the weight of the electric aircraft 610. For instance, the payload can be based on an occupancy of the electric aircraft 610 for the future flight. The occupancy, for example, can be indicative of a number of passengers or an amount/type of cargo for the future flight.

The computing system 605 can compute the flight SoC 630 based on the flight parameters such as the flight itinerary or payload to account for an expected carrying weight for the future flight.

The flight SoC 630 can be calculated using the specific energy profiles of the aircraft 610 for the various flight modes that may be utilized to traverse the route and land at the destination. For example, the departure/take-off maneuvers may involve the aircraft changing the position/orientation of the rotor from a first position which causes vertical lift (hover mode) and rotating to a second position which causes forward thrust (cruise mode). The aircraft 610 may have specific energy profiles for each of these positions. The profiles can be stored in accessible look-up tables. The energy profiles can indicate the aircraft's energy efficiency (e.g., charge/power burn rate) when the rotor is in the first or second position, the hover or cruise mode. The energy profiles can also indicate the energy efficiency of the aircraft 610 when the rotor is transitioning between the first and second positions (e.g., in a transition mode). The flight SoC 630 can be computed based on the amount of time the aircraft's rotor is in each position (or flight mode) and the energy profile of the aircraft 610 in that position (or flight mode).

The buffer SoC 635 can help indicate a mission SoC for the future flight to account for maneuvers, or alternative scenarios, that may occur while traversing the route for the future flight. The buffer SoC 635 can be indicative of a level of charge at one or more temperature ranges, in addition to the flight SoC 630, that will produce enough power to operate the electric aircraft 610 for the duration of the future flight and account for any expected/unexpected maneuvers. For example, the buffer SoC 635 can be indicative of a level of charge for performing one or more flight maneuvers for the future flight.

In some implementations, the buffer SoC 630 may be based on a static percentage, value, etc. that is relative to the one or more of the other threshold SoCs. For example, the buffer SoC 630 may be computed to account for X percent (e.g., 5%) of the planned flight SoC or, in the event of in-flight replanning, X percent (e.g., 5%) of the flight charge for the rest of the flight.

In some implementations, the buffer SoC 635 can be intelligently determined based on the individual flight parameters. For instance, the computing system 605 can access data indicative of flight maneuvers for the future flight and compute the buffer SoC 635 for performing the flight maneuvers for the future flight based on the data.

The data indicative of the flight maneuvers for the future flight, for example, can be stored in a route profile corresponding to a particular flight. The route profile can include route characteristics that are generated based on map data associated with the geographic environment or historical data for a plurality of previous flights performed along the corresponding route. The route profile can indicate expected flight maneuvers that are based on the map data and refined using historical averages computed based on the historical data for the plurality of previous flights performed along the corresponding route.

In some implementations, data can account for timing constraints or operational constraints for the flight. The timing or operational constraints can be stored in the route profile corresponding to the particular flight.

The timing constraints can include current air traffic conditions that may increase or decrease the probability for different maneuvers during the future flight. The timing constraints can be precomputed or extrapolated based on the historical data for the plurality of previous flights performed along the corresponding route.

The operational constraints can include a pilot's flight tendencies, a software version, etc. that may increase or decrease the probability for different maneuvers during the future flight. The operational constraints can be precomputed or extrapolated based on the historical data for the plurality of previous flights performed by the pilot or the electric aircraft. In some implementations, the electric aircraft can include an autonomous aircraft and the operational constraints can include operational limitations and/or historical observations of an autonomous computing system (or software version thereof) onboard the autonomous aircraft. In this manner, the buffer SoC 635 can be tailored to the specific timing and operation of the future flight.

In some implementations, the buffer SoC can be computed based on data associated with the pilot of the electric aircraft. For example, the computing system 605 may access a database that maintains historic performance and flight data for a plurality of pilots ("historic pilot data"). The historic pilot data can be indicative of certain maneuvers, styles, energy usage, timing, etc. for a respective pilot.

Such data can be generated based on log data provided by an aircraft device 435. The log data can be processed and aggregated to determine patterns or summarize the frequency of certain events (e.g., waive-offs), average flight speed, preferred maneuvers, etc. The processed log data can be used to create the database of the historic pilot data for each respective pilot that operates an aircraft for the transportation service. In some cases, such information can be generated by, and accessed from, another computing system.

The historic pilot data can be utilized to compute the buffer SoC 635 based on the pilot of the electric aircraft 610. By way of example, the computing system 605 can query a database, based on an identifier associated with the pilot, to access historic pilot data for that particular pilot. The historic pilot data can indicate the frequency of waive-offs experienced by a pilot for a given vertiport. The computing system 605 can utilize this information to compute the buffer SoC 635 so that a pilot that historically performs more waive-offs for a particular vertiport associated with the future flight, will have the appropriate level of charge should one be encountered for the future flight. In some implementations, a pilot can provide input on the buffer SoC 635 (e.g., through an application on a pilot device or aircraft device).

The buffer SoC 635 can be computed based on the energy efficiency of the aircraft 610 for a specific flight mode. For instance, the buffer SoC 635 can be computed based on the energy efficiency of the electric aircraft 610 when operating in a hover mode. In an example, the buffer SoC 635 can be computed such that the electric aircraft 610 includes enough charge/power to fly in the event the electric aircraft 610 experiences at least one landing waive-off and can hover nearby a destination vertiport for at least 10 minutes. Additionally, or alternatively, the buffer SoC 635 may be computed such the electric aircraft 610 may be able to fly to, and land at, the closest alternative vertiport (other than its destination) at the waypoints along its route.

The buffer SoC 635 may be computed based on at least one flight mode that is not utilized to compute the reserve SoC 625. For example, the reserve SoC 625 may be computed based on the energy efficiency of the aircraft 610 while operating in the cruise mode. This may be described in terms of energy usage per time while the propulsion systems of the aircraft 610 are in a position/angle associated with the cruise mode (e.g., creating forward thrust). Because the buffer SoC 635 may be computed to account for potential waive-offs, hover maneuvers, alternative landings, etc., computing the buffer SoC 635 can be based on the energy efficiency of the aircraft 610 when operating in hover mode, which may not be a consideration for the reserve SoC 625.

In some implementations, the buffer SoC 635 may be associated with a different position of the aircraft's propulsion systems than the reserve SoC 625. For instance, the reserve SoC 625 can be based on the energy efficiency of the electric aircraft 610 when the propulsion systems of the aircraft are in a second position associated with providing forward thrust to the electric aircraft 610. The buffer SoC 635 may be based (at least in part) on the energy efficiency of the electric aircraft 610 when the propulsion systems of the electric aircraft 610 are in a first position for providing vertical lift to the electric aircraft 610. In this way, the computing system 605 can more accurately compute the various charge needs of the electric aircraft 610 by taking into account the particular operating configurations of the aircraft's components. This can lead to improved operation of the electric aircraft 610, while allowing for any contingencies that may need to be exercised by a pilot or aircraft autonomy system.

The computing system 605 can determine an action 645 associated with the electric aircraft 610 based on battery charging parameters 640 that can be tailored to the threshold SoCs (e.g., the reserve SoC 625, the flight SoC 630, or the buffer SoC 635) associated with a future flight.

The action 645 can include: (i) the initial planning of the future flight; (ii) a confirmation of the ability of an electric aircraft to perform a previously planned future flight; (iii) a flight adjustment to the previously planned future flight; or (iv) a downtime adjustment to a preflight activity.

The computing system 605 can transmit instructions indicative of the action 645 associated with the electric aircraft 610 to one or more devices associated with a transportation service such as, for example, devices of a computing ecosystem configured to facilitate a multi-modal transportation service. The computing system 605, for example, can transmit the instructions to one or more aircraft devices 435 associated with the electric aircraft 610, one or more ground vehicle devices 430 associated with a first or last transportation leg of a multi-modal transportation service, or one or more aerial facility device(s) 440 or one or more facility operator user device(s) 445 associated with an origin or destination facility for the electric aircraft 610.

The computing system 605 can confirm the ability of an electric aircraft 610 to perform a previously planned future flight based on the various thresholds described herein. The battery charging parameters 640 can indicate whether the SoC of the batteries achieves at least one of the threshold SoCs. For example, in the event the battery charging parameters 640 indicate that the SoC exceeds the threshold SoCs, the computing system 605 can determine an action 645 that includes a confirmation of the future flight. The confirmation of the future flight can include a confirmation of the assignment of the future flight to the electric aircraft 610, a confirmation of the flight itinerary for the future flight, or a confirmation that the state of the batteries is sufficient to perform the future flight.

The computing system 605 can transmit instructions indicative of the confirmation of the future flight to devices associated with the future flight. By way of example, the computing system 605 can transmit the instructions to an aerial device 435 of the electric aircraft 610 to indicate the future flight to a pilot, confirm that additional charging should not be conducted before the future flight, etc. As another example, the instructions can be transmitted to one or more aerial facility devices 440 or facility operator user devices 445 to approve the electric aircraft 610 for the performance of the future flight.

The computing system 605 can determine a downtime adjustment to a preflight activity based on the various thresholds described herein. For example, the computing system 605 can compute battery charging parameters 640 indicating that the SoC is below at least one of the threshold SoCs. In response, the computing system 605 can determine an action 645 to perform a downtime adjustment to a preflight activity. The preflight activity, for example, can include a charging activity for charging the batteries onboard the electric aircraft 610, a cooling activity for cooling the batteries onboard the electric aircraft 610, etc.

The computing system 605 can transmit data indicative of the battery charging parameters 640 (e.g., a charging time, type, etc.) for charging/cooling the batteries onboard the electric aircraft 610. The data can be transmitted to the aircraft device 435 or to the aerial facility devices 440 or facility operator user devices 445.

In some implementations, the aerial facility devices 440 can include infrastructure devices for battery charging infrastructure, battery cooling infrastructure, etc. at an aerial facility. The instructions can indicate a desired increase to the SoC of the aircraft to achieve the at least one threshold SoC before the future flight. In some implementations, the instructions can include a timing associated with the desired increase.

As yet another example, the computing system 605 can determine an action 645 to perform a flight adjustment to the future flight based on the battery charging parameters 640. For example, flight decisions can be made in real-time to set, increase, or decrease the threshold SoCs for the future flight based on the battery charging parameters 640.

The action 645, for example, can be based on a payload associated with a future flight. For instance, the flight SoC 630 for the future flight can be based on a payload associated with the future flight which can be impacted by the flight itinerary for the future flight. In some implementations, the payload for the future flight can be modified to adjust the threshold SoCs.

For example, the computing system 605 can modify the flight itinerary to increase or decrease the payload. The payload can be increased by adding a user or cargo to the flight itinerary. The payload can be decreased by reassigning a user or cargo from the flight itinerary. An increased payload can increase the threshold SoC for the future flight. A decreased payload can decrease the threshold SoC for the future flight.

By way of example, the computing system 605 can decrease the payload in response to the SoC being below at least one threshold SoC for traversing the route for the future flight. The payload can be decreased to lower the at least one threshold SoC for the future flight to within a SoC of the electric aircraft 610. For example, in the event that the SoC of the electric aircraft 610 does not (or will not) achieve the at least one threshold SoC in time for the future flight, at least one passenger (or a portion of cargo) can be reassigned from the flight itinerary to decrease the payload for the future flight. In this manner, real-time battery information tailored to a specific vehicle can be used to modify a flight itinerary to accommodate lower than expected SoCs for electric aircraft 610 without causing a flight delay.

As another example, the computing system 605 can increase the payload in response to the SoC exceeding at least one threshold SoC for traversing the route for the future flight. The payload can be increased to raise the at least one threshold SoC for the future flight to within a higher limit of the SoC of the electric aircraft 610. For example, in the event that the SoC of the electric aircraft 610 does (or will exceed) the at least one threshold SoC in time for the future flight, at least one passenger (or a portion of cargo) can be added to the flight itinerary to increase the at least one threshold SoC to within a certain range. In this manner, real-time battery information tailored to a specific vehicle can be used to modify a flight itinerary to accommodate a higher payload in the event of higher than expected SoCs for electric aircraft 610.

In some implementations, the computing system 605 can generate or modify a flight itinerary based on one or more impacts to the charging parameters.

For example, the computing system 605 can generate an initial flight itinerary for the electric aircraft 610 based on the charging parameters and the battery conditions of the electric aircraft 610. In some implementations, the computing system 605 can generate a plurality of candidate flight itineraries for a plurality of aircraft. The plurality of candidate flight itineraries can be evaluated for the electric aircraft 610 to determine an initial candidate flight itinerary that can be performed by the electric aircraft without violating at least one of the threshold SoCs.

In addition, or alternatively, a flight itinerary can be modified based on the charging parameters and the battery conditions of the electric aircraft 610. For example, the flight itinerary can be modified to reduce or increase the battery charging parameters 640 (e.g., a charging time, etc.) based on an estimated downtime before the future flight. In some implementations, the battery charging parameters 640 can include a relatively large base cost such that the benefits of increasing the SoC for the batteries by a small percentage may not outweigh the time lost to do so. In some implementations, the computing system 605 can modify a flight itinerary (e.g., by increasing/decreasing a payload) to avoid flight delays or reduce downtime for an electric aircraft 610 throughout an operational time period. In this way, flight decisions can be improved to account for battery specific charging characteristics.

In some implementations, the computing system 605 can modify the flight itinerary based on transportation data associated with a transportation service. For example, the future flight can include an intermediate transportation leg of a multi-modal transportation service. The multi-modal transportation service can include a multi-modal transportation itinerary. The multi-modal transportation itinerary can include a plurality of transportation legs performed by vehicles of a plurality of different modalities. As one example, the multi-modal transportation itinerary can include an initial, ground transportation leg, an intermediate, aerial transportation leg, and a last, ground transportation leg. The future flight can include the intermediate, aerial transportation leg of the multi-modal transportation itinerary.

The computing system 605 can access transportation data indicative of a progress of at least one of the transportation legs of the multi-modal transportation itinerary. The transportation data, for example, can be indicative of the progress of a ground vehicle transporting a user (or cargo) that is currently assigned to the future flight.

The computing system 605 can determine the action 645 associated with the electric aircraft 610 based on the battery charging parameters 640 and the transportation data indicative of the progress of the ground transportation. For instance, the computing system 605 can determine that the user (or cargo) will arrive after the electric aircraft 610 is prepared to perform the future flight.

By way of example, transportation data can indicate that a passenger will arrive at an aerial facility after a charging time identified by the battery charging parameters 640. Thus, the aircraft 610 is predicted to be ready to take-off prior to the passenger's arrival. In such a case, the computing system 605 can modify the flight itinerary by reassigning the passenger to a later flight in order to allow the electric aircraft 610 to take-off as soon as it is ready.

In some cases, the battery charging parameters 640 can be computed to account for a late passenger (or cargo). For instance, the computing system 605 can decrease at least one of the threshold SoCs based on a decreased payload due to the late passenger (or cargo).

In some implementations, the computing system 605 can determine the action 645 based on an estimated impact on one or more transportation services subsequent to the future flight. For instance, the computing system 605 can estimate an expected SoC for the electric aircraft 610 after the performance of the future flight. The expected SoC can be estimated by comparing the SoC before the future flight to at least one of the threshold SoCs for the future flight. The computing system 605 can determine the action 645 to increase or decrease the expected SoC to accommodate a transportation service subsequent to the future flight. By way of example, the computing system 605 can adjust one or more downtime activities (e.g., increase charging, etc.) or modify the flight itinerary in anticipation of flight subsequent to the future flight.

While example embodiments disclosed herein have been described with respect to satisfying static requirement based on regulatory requirements, it will be understood that in other embodiments the performance reserve requirements may be supplemented, replaced, or combined with regulatory performance reserve requirements 625 and may be dynamically computed based on any number of operational factors. For example, one example computing system 605 increases the performance reserve requirements 625 in instances when data indicates off-nominal conditions such as an increased payload or stronger than average wind.

Example Computer-Implemented Processes and Methods

Figure 7:
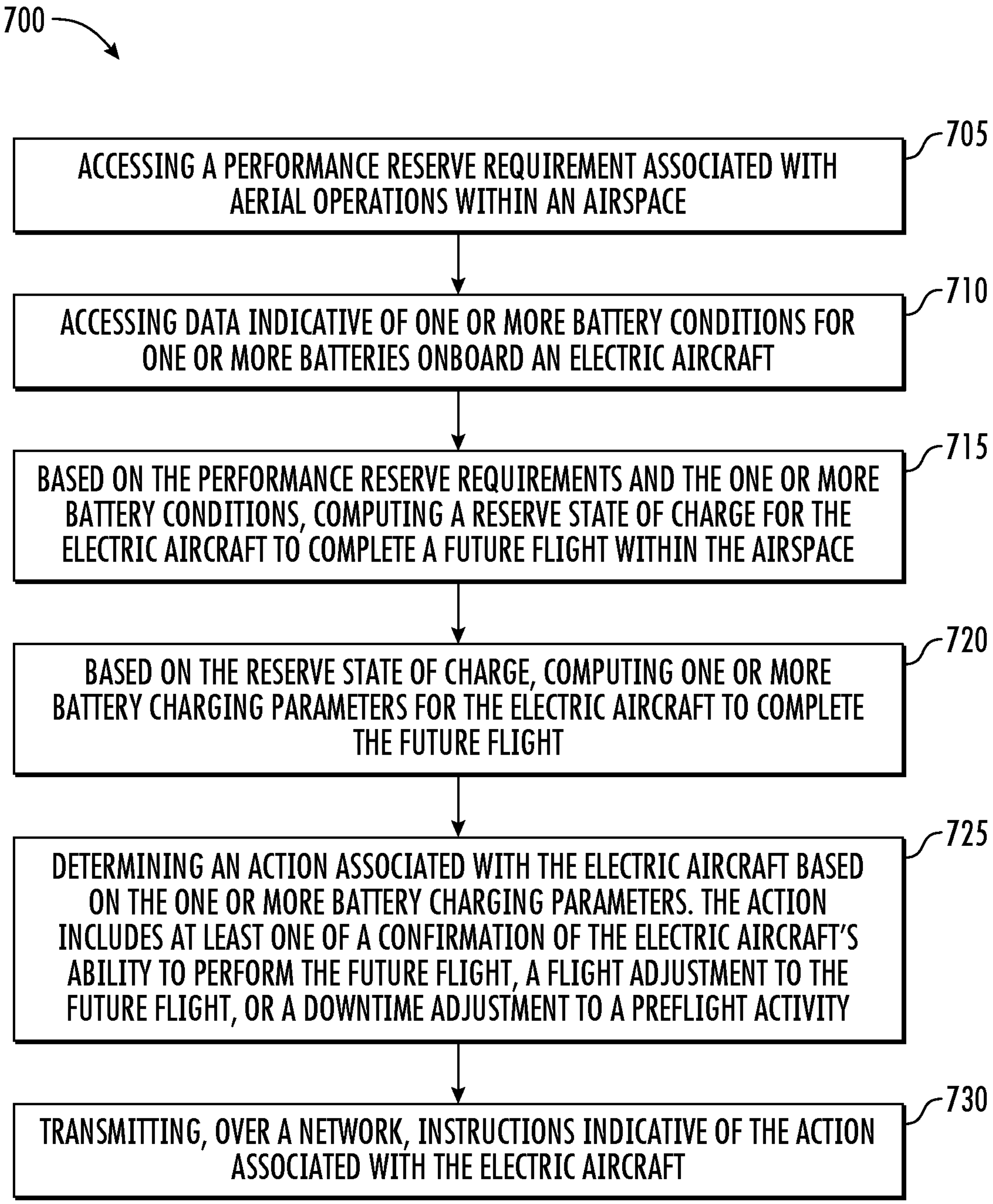
FIG. 7 depicts a flowchart diagram of an example method for initiating an action for a future flight according to example embodiments of the present disclosure.

FIG. 7 depicts a flowchart diagram of an example method 700 for initiating an action for a future flight according to example embodiments of the present disclosure. The method 700 can be performed by a computing system that includes one or more computing devices such as, for example, the computing systems described with reference to the other figures. Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 4A, 5, 6, 10, etc.), for example, to initiate an action for a future flight as discussed herein.

FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure.

FIG. 7 is described with reference to elements/terms described with respect to other systems and figures for exemplary illustrated purposes and is not meant to be limiting. One or more portions of method 700 can be performed additionally, or alternatively, by other systems.

At 705, a computing system can access a performance reserve requirement associated with aerial operations within the airspace. The performance reserve requirement can be accessed in a local memory by the computing system or by calling an API of an airspace computing system (e.g., of a regulatory body). The performance reserve requirement can indicate that an aircraft is required to have enough charge for the aircraft to be able to fly for at least X amount of time under certain conditions. For example, the performance reserve requirement can indicate that an electric aircraft is to have enough battery charge such that the electric aircraft is able to fly for thirty (30) minutes, in still air.

In some implementations, the performance reserve requirement can specify a particular flight mode. For example, the performance reserve requirement can indicate that an electric aircraft is to have enough battery charge, when it lands, such that the electric aircraft is able to fly for thirty (30) minutes, in still air, in a forward thrust flight mode (e.g., a cruise mode).

At 710, the computing system can access data indicative of one or more the battery conditions for one or more batteries onboard the electric aircraft. As described herein, the battery conditions can include a battery type, age, configuration, etc. for each electric battery located onboard the electric aircraft. In some implementations, the battery conditions can include real-time information indicative of the health and status of the batteries of the electric aircraft, as described herein.

Based on the performance reserve requirements and the one or more battery conditions, at 715, the computing system can compute a reserve SoC for the electric aircraft to complete a future flight within the airspace. As described herein, the reserve SoC can indicate a reserve battery charge level that the associated electric aircraft is to have for completing a future flight within the airspace. The reserve battery charge level can be reflective of the threshold level needed to satisfy the performance reserve requirement (e.g., under which a violation may occur).

Figure 8:
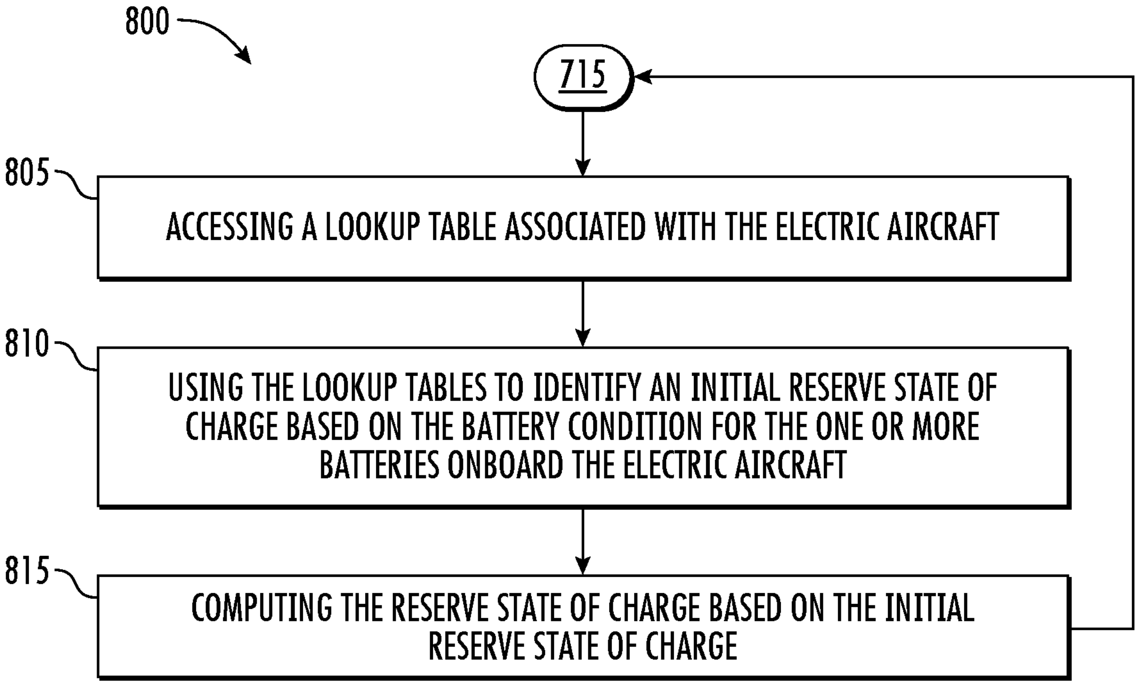
FIG. 8 depicts a flowchart diagram of an example method for computing a battery state reserve for the electric aircraft according to example embodiments of the present disclosure.

The computing system can perform a number of computing functions for computing the reserve SoC. By way of example, FIG. 8 depicts a flowchart diagram of an example method 800 for computing a reserve SoC for the electric aircraft according to example embodiments of the present disclosure. The method 800 can include suboperations of operation 715 of FIG. 7.

At 805, the computing system can access one or more look-up tables associated with the electric aircraft. Accessing the look-up tables can include querying a searchable database using an identifier associated with the electric aircraft or an identifier associated with a model of the electric aircraft. The look-up tables can include a plurality of SoCs that are correlated to a plurality of different battery conditions for the electric aircraft.

At least one of the look-up tables can provide energy profiles for the electric aircraft given the condition of the batteries onboard the electric aircraft. The energy profiles can identify the energy efficiency of the electric aircraft associated with the various conditions such as battery type, age, configuration, etc.

In some implementations, the energy efficiency for an electric aircraft can be associated with a particular flight mode. For example, in the event that the performance reserve requirement is defined for the electric aircraft operating in a cruise mode, the computing system can access look-up tables that correlate with the cruise mode of the electric aircraft.

At 810, the computing system can use the look-up tables to identify an initial reserve SoC based on the battery condition for the one or more batteries onboard the electric aircraft. The computing system can query the look-up table using the battery conditions for the electric aircraft to identify the initial reserve SoC that corresponds to the battery conditions.

By way of example, the initial reserve SoC can be computed based on the look-up tables that indicate the energy efficiency of the particular batteries onboard the electric aircraft. This energy efficiency can allow the computing system to compute the level of charge needed for the electric aircraft to fly for thirty minutes in cruise mode and in still air, given the current battery conditions (e.g., health, age, configuration, efficiency, temperature, etc.).

At 815, the computing system can compute the reserve SoC based on the initial reserve SoC by refining the initial reserve SoC based on current or predicted conditions associated with the future flight. As an example, the initial reserve SoC can be modified to account for higher temperatures, humidity, altitude, etc. that may impact the SoC for an electric battery. These can be the environmental conditions that are predicted to be encountered on an upcoming flight. The computing system can access additional look-up tables that are indicative of the impact of these environmental conditions (e.g., a higher outside temperature) on the aircraft's energy efficiency, needed charge level, etc. In this way, the reserve SoC can take into account the possible effect of these environmental conditions on the non-linear nature of the battery SoC as the electric aircraft performs a future flight.

Additionally, or alternatively, the computing system can refine the initial reserve SoC based on other conditions associated with the future flight. As described herein, this can include a flight route, payload, etc.

Returning to FIG. 7, at 720, the computing system can compute one or more battery charging parameters for the electric aircraft to complete the future flight. The battery charging parameters can be based on the computed reserve SoC. The battery charging parameters can indicate the amount of time, charge level/speed, charging infrastructure, etc. needed to charge the electric aircraft to provide the reserve SoC.

The battery charging parameters can also be computed to account for additional charge levels that the electric aircraft may utilize to complete a future flight. As described herein, this can include a flight SoC (e.g., for flying between origin and destination) as well as a buffer SoC (e.g., to account for contingencies).

Figure 9:
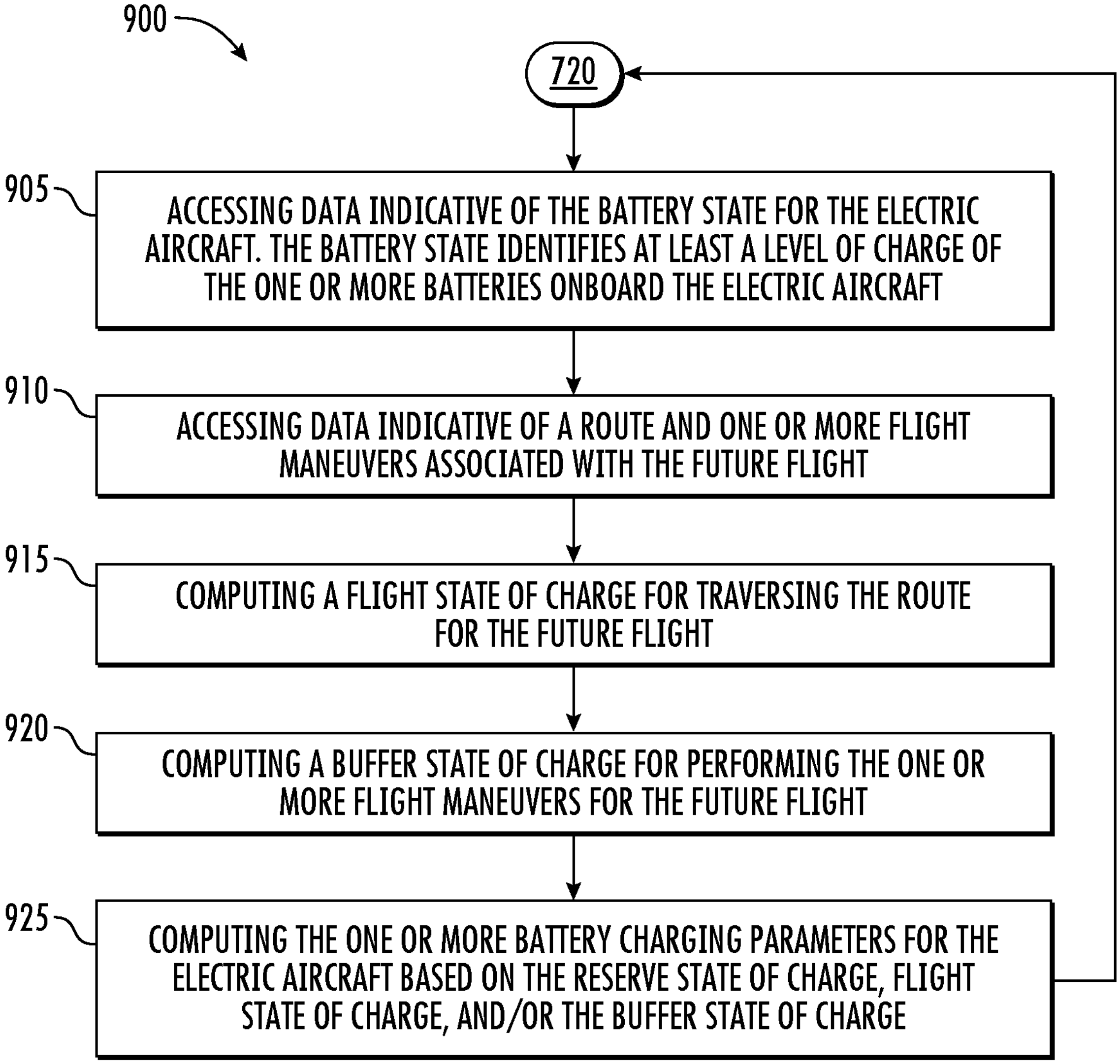
FIG. 9 depicts a flowchart diagram of an example method for computing battery charging parameters for an electric-powered aircraft according to example embodiments of the present disclosure.

FIG. 9 depicts a flowchart diagram of an example method 900 for computing battery charging parameters for an electric aircraft according to example embodiments of the present disclosure. The method 900 can include suboperations of operation 720 of FIG. 7 where the method 700 includes computing battery charging parameters for an electric aircraft to complete a future flight.

At 905, the computing system can access data indicative of the battery state for the electric aircraft. The battery state identifies at least a level of charge of the one or more batteries onboard the electric aircraft. In the event the future flight being considered by the system is the first flight of the day for the electric aircraft, the identified level of charge can be the charge level of the aircraft's batteries at the beginning of the day. In the event the electric aircraft has already performed a flight that day, the identified level of charge can be a current charge level of the aircraft's batteries. Additionally, or alternatively, in the event the electric aircraft is currently performing a flight, the level of charge can be a predicted charge level of the aircraft's batteries, after the current flight is completed.

At 910, the computing system can access data indicative of the route and one or more maneuvers associated with the future flight. For instance, the computing system can query a flight plan datastore to access a data structure that indicates the flight route for the future flight. The data structure can include structed data fields (e.g., such as an object having a class data type defined in a programming language), look-up tables, lists, trees, arrays, etc. The stored information can also be indicative of take-off maneuvers, speeds, flight corridors (e.g., skylanes), approach and landing maneuvers, etc.

The stored information can indicate the various flight modes and the estimated length of time the electric aircraft may be in each flight mode. For example, the landing for this particular flight may require the electric aircraft to operate in hover mode longer than is typical (e.g., due to high traffic at the destination vertiport). In this way, the computing system can understand the operations that will be needed to complete the future flight as well as the time periods the electric aircraft will be in each flight mode.

At 915, the computing system can compute a flight SoC for traversing the route for the future flight. The flight SoC is separate and different from the reserve SoC. The flight SoC can include the threshold battery state/level of charge needed for the electric aircraft to traverse the route associated with the future flight. This includes performing the identified take-off maneuvers, cruising the identified route within the specified sky lanes, performing the identified landing maneuvers (e.g., hover), landing at the destination vertiport, taxi-ing to one or more designated areas, and/or parking.

At 920, the computing system can compute a buffer SoC for performing the one or more flight maneuvers for the future flight. As described herein, the buffer SoC is separate from reserve SoC and the flight SoC. The buffer SoC may not be one that is required by associated airspace regulations. Rather, the buffer SoC can be indicative of an additional charge level that is preferred for performing the future flight. This can include an additional charge for the electric aircraft to perform any contingencies.

In an example, the buffer SoC can be computed so that the electric aircraft has enough charge to reach an alternative vertiport (other than the destination vertiport) at any point along its route. The alternative vertiport can include, for example, the closest vertiport to that point in the route. This can allow for contingencies landings.

In another example, the buffer SoC can be based on the historic conditions and performance of electric aircraft at a destination vertiport. For instance, the computing system can query a database that stores historic data associated with a vertiport. The historic data may indicate that electric aircraft landing at the destination vertiport have previously experienced poorer weather and higher aircraft traffic when trying to land at the destination vertiport. Thus, the computing system may compute the buffer SoC to allow the electric aircraft to have enough additional charge to complete at least one waive-off and to hover nearby the vertiport for a certain timeframe (e.g., 5 minutes, 10 minutes, etc.). In this way, the buffer SoC can be customized to account for potential contingencies that are accurately reflective of circumstances for performing the future flight.

As described herein, the buffer SoC can be based on at least one flight mode that is different than a flight mode used to compute the reserve SoC. For example, as described herein, the electric aircraft can be an electric vertical take-off and lift vehicle (eVTOL) that includes rotors that are configured to adjust from a first position to a second position. The first position of the rotors can be configured for providing a lift force for the electric aircraft. This can be associated with a hover mode of the electric aircraft. The second position of the rotors can be configured for providing a forward thrust force for the electric aircraft. This can be associated with a cruise mode of the electric aircraft. The reserve SoC can be based on the performance reserve requirement that the electric aircraft have enough charge to fly for 30 minutes in cruise mode. The reserve SoC can, thus, be computed based on an energy efficiency of the electric aircraft while the rotors are in the second position (e.g., cruise mode). However, the buffer SoC can be computed so that the electric aircraft has enough additional charge to perform contingency maneuvers including waive-off maneuvers, hover maneuvers, and contingency landings. Thus, the buffer SoC can be computed based on an energy efficiency of the electric aircraft while the rotors are in the first position (e.g., hover mode), as well as the energy efficiency of the electric aircraft while the rotors are in the second position (e.g., cruise mode), if needed.

At 925, the computing system can compute the one or more battery charging parameters for the electric aircraft based on the reserve SoC, the flight SoC, and/or the buffer SoC. For example, the computing system can compute the amount of charge time, charge level, thermal management, charging speed, charging infrastructure, etc. needed for the batteries of the electric aircraft to obtain the reserve SoC, the flight SoC, and the buffer SoC prior to the future flight.

Returning to FIG. 7, at 725, the computing system can determine an action associated with the electric aircraft based on the one or more battery charging parameters. The action can include at least one of: a confirmation of the electric aircraft's ability to perform the future flight, a flight adjustment to the future flight, or a downtime adjustment to a preflight activity.

Confirming the electric aircraft's ability to perform the future flight can include, for example, an analysis of the battery charging parameters. For example, the computing system can evaluate whether the battery charging parameters that are needed to deliver the reserve SoC, flight SoC, and buffer SoC are achievable prior to the future flight. If so, the computing system can confirm the ability of the electric aircraft to perform the future flight. The computing system can add the future flight to the daily itinerary of the electric aircraft.

If the battery charging parameters that are needed to deliver the reserve SoC, flight SoC, and buffer SoC are not achievable prior to the future flight, the computing system can determine a different action may be preferrable.

For example, the computing system can determine that it is preferable to make an adjustment to the future flight. This can include, for example, adjusting the take-off time, payload, route, or other operating parameters of the future flight, to reduce the levels of charge needed for the future flight. As such, the charging parameters may be changed in a manner that would allow the electric aircraft to receive the reserve SoC, flight SoC, and buffer SoC prior to the future flight.

Additionally, or alternatively, the computing system can determine that is preferable to make a downtime adjustment to a preflight activity. For example, preflight activities can include assigning infrastructure for charging and cooling the electric aircraft's batteries. In order to allow the electric aircraft to receive the reserve SoC, flight SoC, and buffer SoC prior to the future flight, the computing system can adjust the charger/cooling infrastructure assignments of other aircraft to allow the electric aircraft to utilize a higher speed charger or faster battery cooling system so that the battery parameters can be reached prior to the future flight. In this way, the computing system can leverage its understanding of the aircraft and infrastructure, as well as the complex service constraints, to make ecosystem-level changes to help deliver the reserve SoC, flight SoC, and buffer SoC to the electric aircraft prior to its future flight.

Any adjustments can be made in a manner that limits the impact on any passenger and their ultimate ETAs. For example, when deciding whether to adjust a payload of the future flight, the computing system can access data indicative of a progress of a ground transportation service for a user currently assigned to the future flight. This data may indicate that the user is predicted to be delayed in arriving for the future flight. The computing system can compute the action of the electric aircraft based on the data indicative of the progress of the ground transportation service by re-assigning the user that is delayed to an alternate flight. The alternate flight may more appropriately align with the user's arrival time, while also allowing the user to reach their ultimate destination with the preferred timeframe. In this manner, the payload for the future flight can be adjusted (e.g., to reduce the threshold charge levels), while limiting the impact on the transportation service by reassigning a user that is already delayed.

At 730, the computing system can transmit instructions indicative of the action associated with the electric aircraft. This can include, for example, transmitting data indicating the electric aircraft is assigned to the future flight and the battery charging parameters for the aircraft's batteries. Such data can be transmitted to aircraft devices, aerial facility devices, facility operator devices, pilot devices, etc. This can allow the battery charging parameters to be displayed to personnel or automatically implemented by assigned charging infrastructure.

Example Computing Systems and Components

Figure 10:
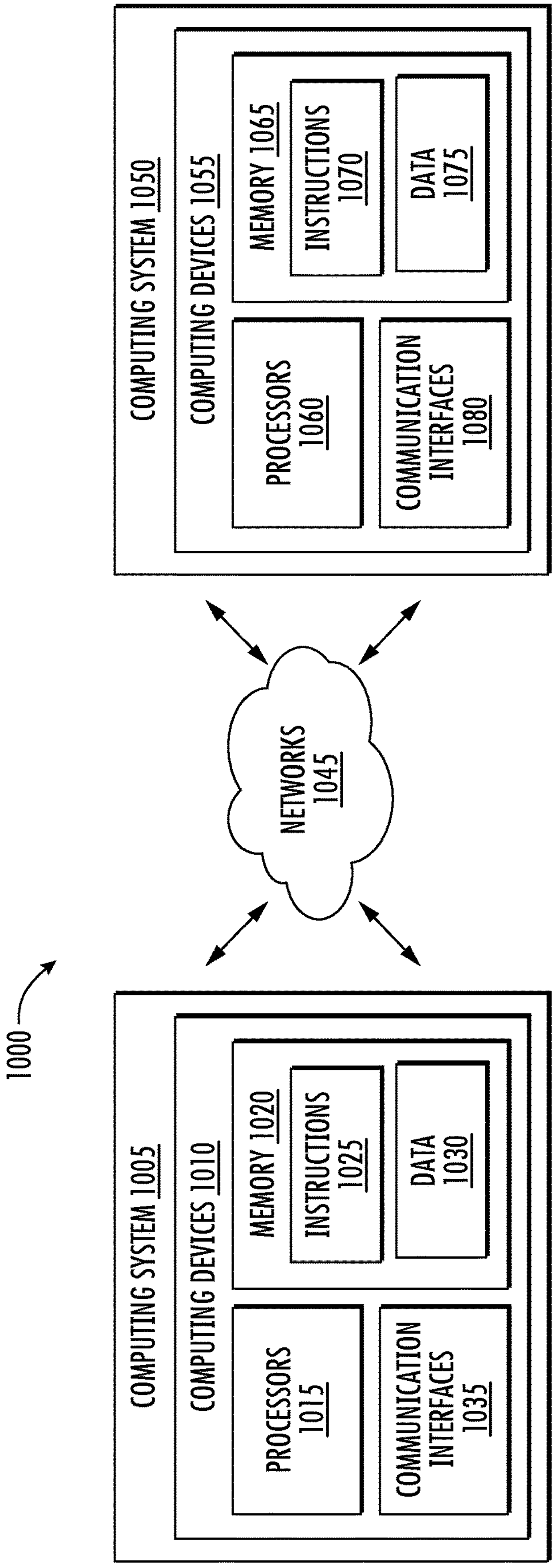
FIG. 10 depicts a block diagram of an example computing system according to example implementations of the present disclosure.

FIG. 10 depicts example system components of an example system 1000 according to example implementations of the present disclosure. The example system 1000 can include the computing system 1005 and the computing system 1050 that are communicatively coupled over one or more networks 1045.

The computing system 1005 can include one or more computing devices 1010. The computing devices 1010 of the computing system 1005 can include one or more processors 1015 and a memory 1020. The processors 1015 can be any suitable processing device (e.g., a processor core, a microprocessor, an ASIC, a FPGA, a controller, a microcontroller, etc.) and can be one processor or a plurality of processors that are operatively connected. The memory 1020 can include one or more non-transitory computer-readable storage media, such as RAM, ROM, EEPROM, EPROM, one or more memory devices, flash memory devices, etc., and combinations thereof.

The memory 1020 can store information that can be accessed by the processors 1015. For instance, the memory 1020 (e.g., one or more non-transitory computer-readable storage mediums, memory devices) can include computer-readable instructions 1025 that can be executed by the processors 1015. The instructions 1025 can be software written in any suitable programming language or can be implemented in hardware. Additionally, or alternatively, the instructions 1025 can be executed in logically or virtually separate threads on processors 1015.

For example, the memory 1020 can store instructions 1025 that when executed by the processors 1015 cause the processors 1015 to perform operations such as any of the operations and functions of any of the computing systems (e.g., aerial transportation platform system, ground transportation platform system, third party provider system, airspace system, etc.) or computing devices (e.g., user devices, ground vehicle devices, aircraft devices, aerial facility devices facility operator user devices, etc.), as described herein.

The memory 1020 can store data 1030 that can be obtained, received, accessed, written, manipulated, created, or stored. The data 1030 can include, for instance, SoC information or other data/information described herein. In some implementations, the computing devices 1010 can access from or store data in one or more memory devices that are remote from the computing system 1005 such as one or more memory devices of the computing system 1050.

The computing devices 1010 can also include a communication interface 1035 used to communicate with one or more other systems (e.g., computing system 1050). The communication interface 1035 can include any circuits, components, software, etc. for communicating via one or more networks (e.g., 1045). In some implementations, the communication interface 1035 can include for example, one or more of a communications controller, receiver, transceiver, transmitter, port, conductors, software or hardware for communicating data/information.

The computing system 1050 can include one or more computing devices 1055. The computing devices 1055 can include one or more processors 1060 and a memory 1065. The one or more processors 1060 can be any suitable processing device (e.g., a processor core, a microprocessor, an ASIC, a FPGA, a controller, a microcontroller, etc.) and can be one processor or a plurality of processors that are operatively connected. The memory 1065 can include one or more non-transitory computer-readable storage media, such as RAM, ROM, EEPROM, EPROM, one or more memory devices, flash memory devices, etc., and combinations thereof.

The memory 1065 can store information that can be accessed by the processors 1060. For instance, the memory 1065 (e.g., one or more non-transitory computer-readable storage mediums, memory devices) can store data 1075 that can be obtained, received, accessed, written, manipulated, created, or stored. The data 1075 can include, for instance, battery state data, battery conditions, or other data or information described herein. In some implementations, the computing system 1050 can access data from one or more memory devices that are remote from the computing system 1050.

The memory 1065 can also store computer-readable instructions 1070 that can be executed by the processors 1060. The instructions 1070 can be software written in any suitable programming language or can be implemented in hardware. Additionally, or alternatively, the instructions 1070 can be executed in logically or virtually separate threads on processors 1060. For example, the memory 1065 can store instructions 1070 that when executed by the processors 1060 cause the processors 1060 to perform any of the operations or functions described herein, including, for example, any of the operations and functions of any of the computing systems (e.g., aerial transportation platform system, ground transportation platform system, third party provider system, airspace system, etc.) or computing devices (e.g., user devices, ground vehicle devices, aircraft devices, aerial facility devices facility operator user devices, etc.), as described herein.

The computing devices 1055 can also include a communication interface 1080 used to communicate with one or more other systems. The communication interface 1080 can include any circuits, components, software, etc. for communicating via one or more networks (e.g., 1045). In some implementations, the communication interface 1080 can include for example, one or more of a communications controller, receiver, transceiver, transmitter, port, conductors, software or hardware for communicating data/information.

The networks 1045 can be any type of network or combination of networks that allows for communication between devices. In some implementations, the networks 1045 can include one or more of a local area network, wide area network, the Internet, secure network, cellular network, mesh network, peer-to-peer communication link or some combination thereof and can include any number of wired or wireless links. Communication over the networks 1045 can be accomplished, for instance, via a network interface using any type of protocol, protection scheme, encoding, format, packaging, etc.

FIG. 10 illustrates one example system 1000 that can be used to implement the present disclosure. Other computing systems can be used as well. Computing tasks discussed herein as being performed at computing devices remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. At times, elements can be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . , (i), (ii), (iii), . . . , etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. can be performed before, after, or in parallel with another operation illustrated by a list identifier of (b), (ii), etc.

What is claimed is:

1. A computer-implemented method comprising:

accessing a performance reserve requirement associated with aerial operations within an airspace;

accessing data indicative of one or more battery conditions for one or more batteries onboard an electric aircraft;

accessing data indicative of a future flight, wherein the data indicative of the future flight comprises an estimated amount of time or distance that the electric aircraft will operate in a cruise mode and an estimated amount of time or distance that the electric aircraft will operate in a hover mode;

based on the performance reserve requirements and the one or more battery conditions, computing a reserve state of charge for the electric aircraft to complete the future flight within the airspace given the estimated amount of time or distance that the electric aircraft will operate in the cruise mode and the estimated amount of time or distance that the electric aircraft will operate in the hover mode, wherein the reserve state of charge is computed to determine an amount of battery charge for the electric aircraft to be able to operate in the hover mode for a threshold amount of hover time and be able to vertically land throughout a route associated with the future flight;

based on the reserve state of charge, computing one or more battery charging parameters for the electric aircraft to complete the future flight;

computing an action associated with the electric aircraft based on the one or more battery charging parameters, wherein the action comprises at least one of: (i) a confirmation of the electric aircraft's ability to perform the future flight; (ii) a downtime adjustment to a preflight activity; or (iii) a flight adjustment to the future flight; and transmitting over a network, instructions indicative of the action associated with the electric aircraft, to at least one of: an aircraft computing device, a pilot computing device, an aerial facility computing device, or a facility operator computing device.

2. The computer-implemented method of claim 1, wherein the one or more battery conditions are indicative of a capacity of the one or more batteries, wherein the reserve state of charge is based on the performance reserve requirements and the capacity of the one or more batteries.

3. The computer-implemented method of claim 2, wherein the capacity of the one or more batteries is based on an age or a usage history of the one or more batteries.

4. The computer-implemented method of claim 1, wherein the one or more battery conditions are indicative of a current state of charge or a future predicted state of charge of the one or more batteries onboard the electric aircraft.

5. The computer-implemented method of claim 1, wherein the preflight activity comprises a charging activity for increasing a state of charge of the one or more batteries onboard the electric aircraft; and wherein providing the instructions indicative of the action associated with the electric aircraft comprises:

providing data indicative of the one or more battery charging parameters for increasing the state of charge of the one or more batteries onboard the electric aircraft.

6. The computer-implemented method of claim 1, further comprising:

accessing data indicative of a route for the future flight;

computing a flight state of charge for traversing the route for the future flight; and wherein computing the one or more battery charging parameters for the electric aircraft to complete the future flight further comprises computing the one or more battery charging parameters for the electric aircraft based on the flight state of charge for traversing the route for the future flight.

7. The computer-implemented method of claim 6, wherein the future flight is associated with a flight itinerary indicative of a payload for the future flight, wherein computing the flight state of charge for traversing the route for the future flight is based on the payload for the future flight.

8. The computer-implemented method of claim 1, further comprising:

accessing data indicative of one or more flight maneuvers for the future flight;

computing a buffer state of charge for performing the one or more flight maneuvers for the future flight; and wherein computing the one or more battery charging parameters for the electric aircraft to complete the future flight further comprises computing the one or more battery charging parameters for the electric aircraft based on the buffer state of charge for performing the one or more flight maneuvers for the future flight.

9. The computer-implemented method of claim 8, wherein the electric aircraft is an electric vertical take-off and lift vehicle comprising rotors that are configured to adjust from a first position to a second position, wherein the first position of the rotors is configured for the hover mode, wherein the second position of the rotors is configured for the cruise mode, wherein the reserve state of charge is computed based on an energy efficiency of the electric aircraft while the rotors are in the second position, and wherein the buffer state of charge is computed based on an energy efficiency of the electric aircraft while the rotors are in the first position.

10. The computer-implemented method of claim 1, wherein the future flight is an intermediate transportation leg of a multi-modal transportation service.

11. The computer-implemented method of claim 1, wherein the electric aircraft is performing a current flight before the future flight.

12. The computer-implemented method of claim 1, wherein computing the action associated with the electric aircraft comprises:

accessing data indicative of a progress of a ground transportation service for a user currently assigned to the future flight; and computing the action of the electric aircraft based on the data indicative of the progress of the ground transportation service.

13. One or more non-transitory, computer-readable media storing instructions that are executable by one or more processors to cause the one or more processors to perform operations, the operations comprising:

accessing a performance reserve requirement associated with aerial operations within an airspace;

accessing data indicative of one or more battery conditions for one or more batteries onboard an electric aircraft;

accessing data indicative of a future flight, wherein the data indicative of the future flight comprises an estimated amount of time or distance that the electric aircraft will operate in a cruise mode and an estimated amount of time or distance that the electric aircraft will operate in a hover mode;

based on the performance reserve requirements and the one or more battery conditions, computing a reserve state of charge for the electric aircraft to complete the future flight within the airspace given the estimated amount of time or distance that the electric aircraft will operate in the cruise mode and the estimated amount of time or distance that the electric aircraft will operate in the hover mode, wherein the reserve state of charge is computed to determine an amount of battery charge for the electric aircraft to be able to operate in the hover mode for a threshold amount of hover time and be able to vertically land throughout a route associated with the future flight;

determining an action associated with the electric aircraft based on the reserve state of charge, wherein the action comprises at least one of: (i) a confirmation of the electric aircraft's ability to perform of the future flight, (ii) a downtime adjustment to a preflight activity; or (iii) a flight adjustment to the future flight; and providing, instructions indicative of the action associated with the electric aircraft, to at least one of: an aircraft computing device, a pilot computing device, an aerial facility computing device, or a facility operator computing device.

14. The one or more non-transitory, computer-readable media of claim 13, wherein the one or more battery conditions are indicative of a current state of charge or a future predicted state of charge of the one or more batteries onboard the electric aircraft; and wherein the action associated with the electric aircraft is based on the current state of charge or the future predicted state of charge of the one or more batteries onboard the electric aircraft.

15. The one or more non-transitory, computer-readable media of claim 13, wherein the operations further comprise:

accessing data indicative of a route for the future flight;

computing a flight state of charge for traversing the route for the future flight; and computing one or more battery charging parameters for the electric aircraft based on the flight state of charge for traversing the route for the future flight.

16. The one or more non-transitory, computer-readable media of claim 15, wherein the future flight is associated with a flight itinerary indicative of a payload for the future flight; and wherein computing the flight state of charge for traversing the route for the future flight comprises computing the flight state of charge for traversing the route based on the payload.

17. The one or more non-transitory, computer-readable media of claim 16, wherein the flight adjustment to the future flight comprises a modification to the flight itinerary, wherein the modification comprises adjusting the payload of the aircraft for the future flight based on the one or more battery charging parameters.

18. The one or more non-transitory, computer-readable media of claim 17, wherein adjusting the payload of the aircraft comprises:

decreasing the payload in response to the state of charge being below the flight state of charge for traversing the route for the future flight; or increasing the payload in response to the state of charge exceeding the flight state of charge for traversing the route for the future flight.

19. The one or more non-transitory, computer-readable media of claim 18, wherein increasing the payload comprises adding a user to the flight itinerary.

20. A computing system comprising:

one or more processors; and one or more tangible, non-transitory, computer readable media that store instructions that are executable by the one or more processors to cause the computing system to perform operations, the operations comprising:

accessing a performance reserve requirement associated with aerial operations within an airspace;

accessing one or more battery conditions for one or more batteries onboard an electric aircraft;

accessing data indicative of a future flight, wherein the data indicative of the future flight comprises an estimated amount of time or distance that the electric aircraft will operate in a cruise mode and an estimated amount of time or distance that the electric aircraft will operate in a hover mode;

based on the performance reserve requirements and the one or more battery conditions, computing a reserve state of charge for the electric aircraft to complete the future flight within the airspace given the estimated amount of time or distance that the electric aircraft will operate in the cruise mode and the estimated amount of time or distance that the electric aircraft will operate in the hover mode, wherein the reserve state of charge is computed to determine an amount of battery charge for the electric aircraft to be able to operate in the hover mode for a threshold amount of hover time and be able to vertically land throughout a route associated with the future flight;

computing a reserve state of charge for the aircraft based on the performance reserve requirements and the one or more battery conditions, wherein the reserve state of charge indicates a reserve battery charge level for completing a future flight within the airspace;

based on the reserve state of charge, computing one or more battery charging parameters for the electric aircraft to complete the future flight;

determining an action associated with the electric aircraft based on the one or more battery charging parameters; and providing, instructions indicative of the action associated with the electric aircraft, to at least one of: an aircraft computing device, a pilot computing device, an aerial facility computing device, or a facility operator computing device.

21. The computer-implemented method of claim 1, wherein computing the reserve state of charge for the electric aircraft further comprises computing the reserve state of charge based on aerial traffic associated with a landing destination for the future flight.

22. The computer-implemented method of claim 1, wherein the instructions indicative of the action associated with the electric aircraft comprise at least one of: instructions to display one or more battery charging parameters, instructions assigning charging infrastructure for the electric aircraft, or instructions to automatically implement the one or more battery charging parameters by charging infrastructure.

* * * * *